(12) United States Patent
Kwon et al.

(10) Patent No.: US 12,547,487 B2
(45) Date of Patent: Feb. 10, 2026

(54) ELECTRONIC SYSTEM AND METHOD OF MANAGING ERRORS OF THE SAME

(71) Applicant: SAMSUNG ELECTRONICS CO., LTD., Suwon-si (KR)

(72) Inventors: Hwajeong Kwon, Suwon-si (KR); Taeyong Kim, Suwon-si (KR); Kwangkyu Bang, Suwon-si (KR); Sangkuk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/430,328

(22) Filed: Feb. 1, 2024

(65) Prior Publication Data
US 2025/0021426 A1   Jan. 16, 2025

(30) Foreign Application Priority Data

Jul. 13, 2023   (KR) .................. 10-2023-0090907

(51) Int. Cl.
G06F 11/07   (2006.01)
G06F 11/14   (2006.01)
G06F 11/30   (2006.01)

(52) U.S. Cl.
CPC ...... *G06F 11/0793* (2013.01); *G06F 11/0778* (2013.01); *G06F 11/079* (2013.01); *G06F 11/1415* (2013.01); *G06F 11/3003* (2013.01)

(58) Field of Classification Search
CPC ............ G06F 11/0793; G06F 11/0778; G06F 11/079; G06F 11/1415; G06F 11/3003;
(Continued)

(56) References Cited

U.S. PATENT DOCUMENTS 8,527,814 B1 * 9/2013 Elwell ................. G06F 11/0793
717/124
8,868,979 B1 10/2014 Zhang et al.
(Continued)

FOREIGN PATENT DOCUMENTS

CN   102637144 A   8/2012
CN   104795014 A   7/2015
(Continued)

Primary Examiner — Albert Decady
Assistant Examiner — Enam Ahmed
(74) Attorney, Agent, or Firm — Sughrue Mion, PLLC

(57) ABSTRACT

An electronic system includes a monitored device and a management device. The monitored device operates according to an operating system and generates a display image. The management device is connected to the monitored device through a communication network. The management device periodically receives, from the monitored device, screen image data corresponding to the display image, determines whether an error that causes the operating system of the monitored device to become inoperable occurs in the operating system of the monitored device based on a network connection state with the monitored device, determines a type of the error based on error determination factors and an analysis result of the screen image data, and transfers, to the monitored device, a request indicating follow-up actions to take to resolve the error, the follow-up actions corresponding to the type of the error.

20 Claims, 27 Drawing Sheets

(58) Field of Classification Search
CPC .......... G06F 11/0769; G06F 11/0772; G06F 11/0787; G06F 11/0781; G06F 11/0751; G06F 11/1438; G06F 11/3006; G06F 11/3055; G06K 7/1417; G06V 10/56; G06V 30/10
USPC .......................................................... 714/2
See application file for complete search history.

(56) References Cited

U.S. PATENT DOCUMENTS

| | | | |
|---|---|---|---|
| 10,585,731 | B2 | 3/2020 | Soffer |
| 2008/0209255 | A1* | 8/2008 | Seguin ............... G06F 11/0748 714/E11.178 |
| 2010/0251002 | A1* | 9/2010 | Sivasubramanian ....................... G06F 11/0793 714/2 |
| 2011/0002000 | A1* | 1/2011 | Tomaru ................ G06F 11/079 358/1.14 |
| 2014/0201126 | A1* | 7/2014 | Zadeh ................... A61B 5/165 706/52 |
| 2018/0365309 | A1* | 12/2018 | Oliner .................... G06F 9/542 |
| 2022/0020171 | A1 | 1/2022 | Dimitriou |
| 2022/0066456 | A1* | 3/2022 | Ebrahimi Afrouzi ....................... G06F 3/04883 |
| 2022/0345668 | A1 | 10/2022 | Cunningham et al. |

FOREIGN PATENT DOCUMENTS

| | | |
|---|---|---|
| CN | 105511937 A | 4/2016 |
| CN | 107480033 A | 12/2017 |

* cited by examiner

FIG. 4

| EDF | | ETP |
|---|---|---|
| IMAGE | STATE | |
| CLR<br>QRCD<br>CHSTR<br>MKR<br>IMDFF<br>⋮ | NWST<br>PWST<br>⋮ | BSOD<br>SUFZ<br>BLKS<br>OSFZ<br>NWERR<br>⋮ |

FIG. 7
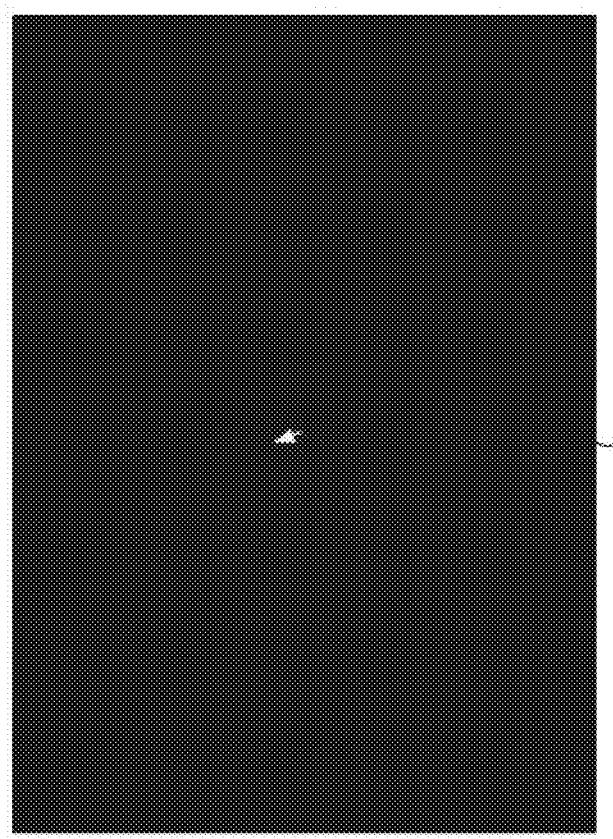
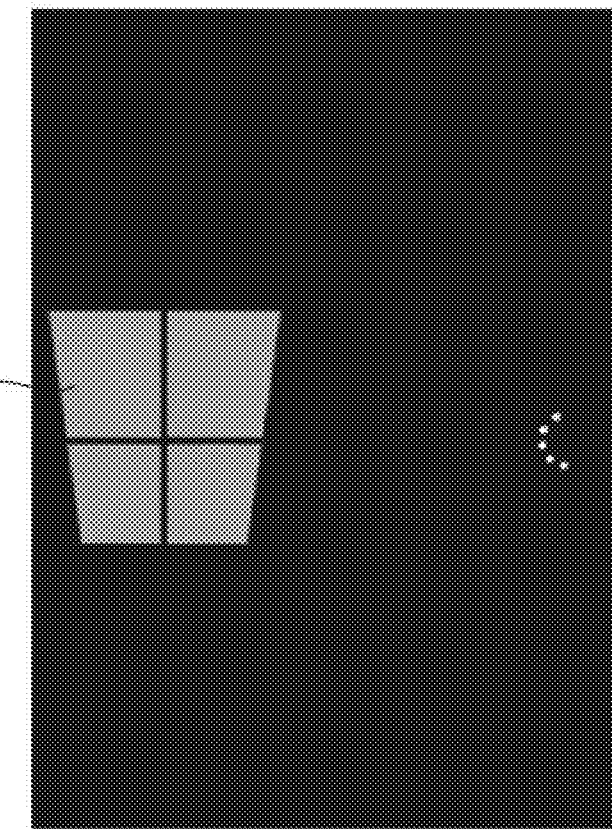

FIG. 8
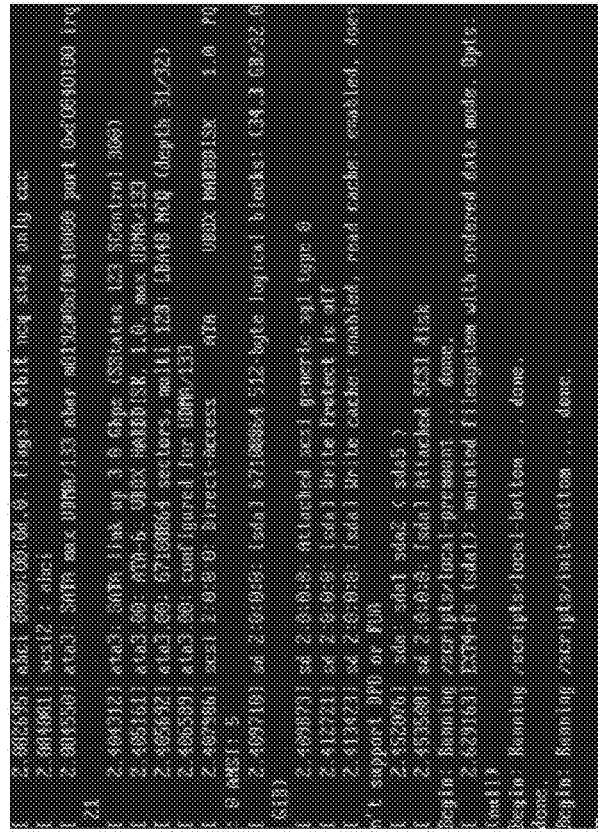
SIMG5
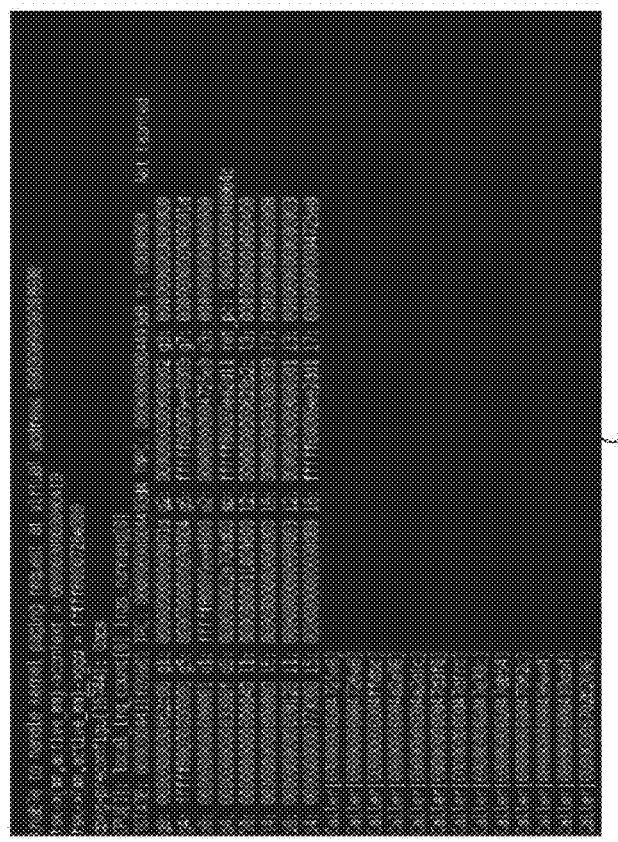
SIMG6

FIG. 9
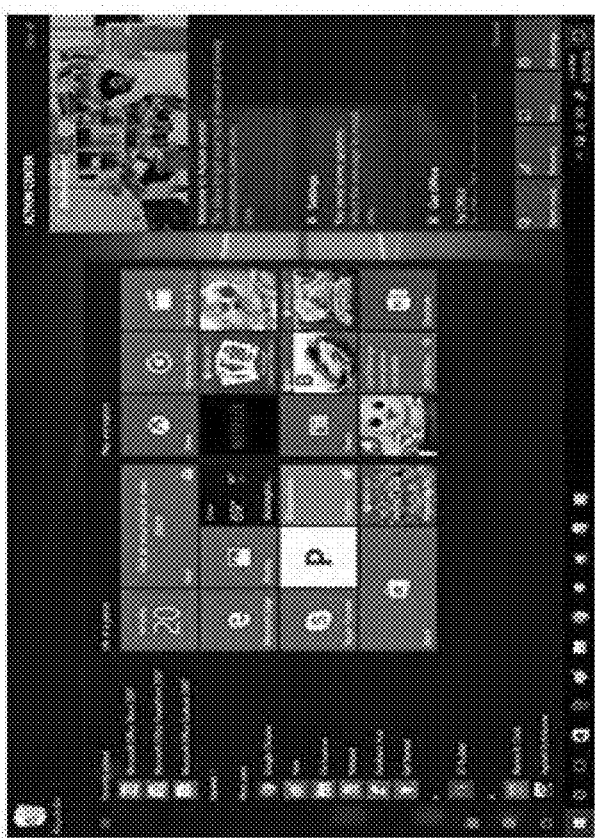
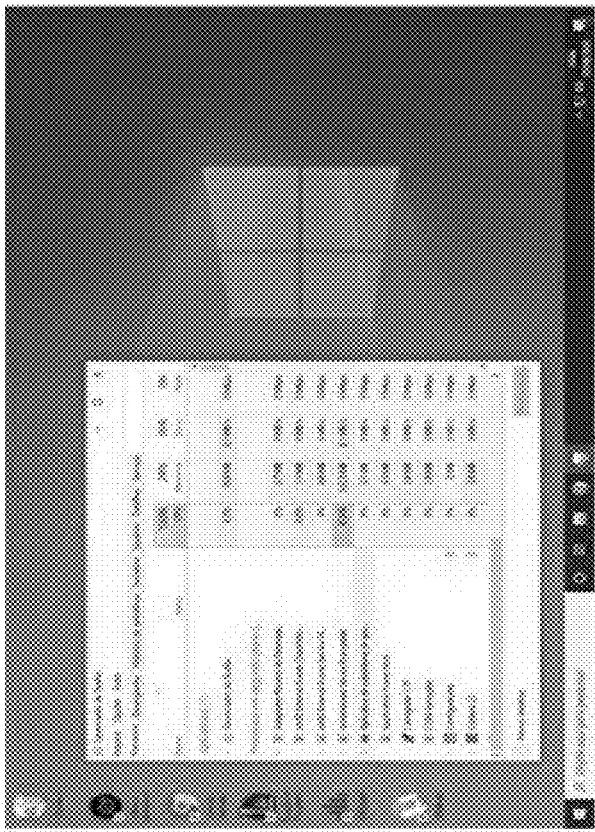

ELECTRONIC SYSTEM AND METHOD OF MANAGING ERRORS OF THE SAME

CROSS-REFERENCE TO RELATED APPLICATION

This U.S. non-provisional application claims priority under 35 USC § 119 to Korean Patent Application No. 10-2023-0090907, filed on Jul. 13, 2023, in the Korean Intellectual Property Office (KIPO), the disclosure of which is incorporated by reference herein in its entirety.

BACKGROUND

Example embodiments relate generally to semiconductor integrated circuits, and more particularly to an electronic system and a method of managing errors of an electronic system.

Most electronic devices or systems run operating system software, and the operating system (OS) may not respond to commands or requests from input devices such as a keyboard, a mouse, etc. or remote devices via a network when an unexpected serious error occurs. In this case, a person must personally visit the place where the electronic device is located and perform analysis or recovery.

In the case of a Blue Screen of Death (BSOD) in Windows™, the operating system software provides options to perform a memory dump for analysis of the operating system software and reboot the operating system software, but in other cases, follow-up actions such as analysis or recovery can only be carried out through an in-person visit to the physical location of the failed electronic device running the operating system software. Additionally, when an operating system error occurs due to a peripheral device such as a storage device, the memory dump and operating system reboot provided by Windows™ are useless because the error situation and analysis time are important.

SUMMARY

It is an aspect to provide an electronic system and a method of managing errors of an electronic system that is capable of efficiently managing uncontrollable errors in an operating system.

According to an aspect of one or more example embodiments, there is provided an electronic system comprising a monitored device configured to operate according to an operating system and generate a display image; and a management device connected to the monitored device through a communication network and configured to periodically receive, from the monitored device, screen image data corresponding to the display image; determine whether an error that causes the operating system of the monitored device to become inoperable occurs in the operating system of the monitored device based on a network connection state with the monitored device; determine a type of the error based on a plurality of error determination factors and an analysis result of the screen image data; and transfer, to the monitored device, a request indicating follow-up actions to take to resolve the error, the follow-up actions corresponding to the type of the error.

According to another aspect of one or more example embodiments, there is provided an electronic system comprising a plurality of monitored devices, each configured to operate according to an operating system, the plurality of monitored devices being configured to generate a plurality of display images, respectively; and a management device connected to the plurality of monitored devices through a communication network and configured to periodically receive, from the plurality of monitored devices, a plurality of screen image data corresponding to the plurality of display images; determine whether an error that causes the operating system of one of the plurality of monitored devices to become inoperable occurs in the operating system of the one of the plurality of monitored devices based on a network connection state with the plurality of monitored devices; determine a type of the error based on a plurality of error determination factors and an analysis result of the plurality of screen image data of the one of the plurality of monitored devices; and transfer, to the one of the plurality of monitored devices, a request indicating follow-up actions to take to resolve the error, the follow-up actions corresponding to the type of the error.

According to yet another aspect of one or more example embodiments, there is provided a method of managing errors of a monitored device that operates according to an operating system and is configured to generate a display image, the method being performed by a management device connected to the monitored device through a communication network, the method comprising periodically receiving, from the monitored device, screen image data corresponding to the display image; determining whether an error that causes the operating system of the monitored device to become inoperable occurs in the operating system of the monitored device based on a network connection state with the monitored device; determining a type of the error based on a plurality of error determination factors and an analysis result of the screen image data; and transferring, to the monitored device, a request indicating follow-up actions to take to resolve the error, the follow-up actions corresponding to the type of the error.

BRIEF DESCRIPTION OF THE DRAWINGS

Various example embodiments will be more clearly understood from the following detailed description taken in conjunction with the accompanying drawings, in which:

FIG. 4 is a diagram illustrating error determination factors and error types according to example embodiments;

FIGS. 6 through 10 are diagrams illustrating examples of screen image data in a method of managing errors of an electronic system according to example embodiments;

DETAILED DESCRIPTION

Figure 1:
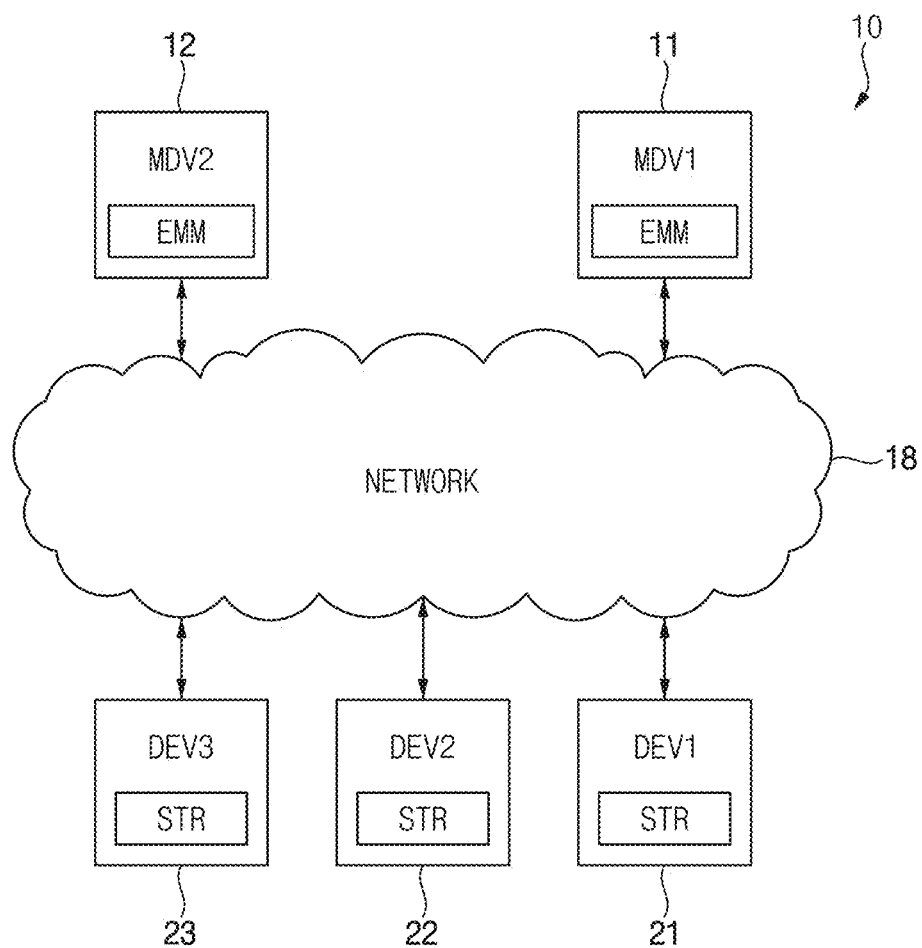
FIG. 1 is a diagram illustrating an electronic system according to example embodiments.

Various example embodiments will be described more fully hereinafter with reference to the accompanying drawings, in which some example embodiments are shown. In the drawings, like numerals refer to like elements throughout, and repeated descriptions thereof may be omitted for conciseness.

In this disclosure, the term "module" or "unit" as used in the specification indicates that software or hardware constitutes a component, and "module" or "unit" performs certain functions. However, "module" or "unit" is not meant to be limited to software or hardware. "Module" or "unit" may be configured to be stored on an addressable storage medium, or may be configured to be executed by more than one processor. Thus, by way of example, "module" or "unit" may include components such as software components, object-oriented software components, class components and task components, and at least one of processes, functions, properties, programs, subroutines, program snippets, drivers, firmware, microcode, circuits, data, databases, data structures, tables, arrays, or variables. Components and "modules" or "units" of the functionality provided internally may be combined into a smaller number of components and "modules" or "units", or may be further separated into add-ons and "modules" or "units".

According to an embodiment of the disclosure, "module" or "portion" may be implemented by a processor and memory. "Processor" is interpreted broadly in a way that includes central processing units (CPUs), microprocessors, digital signal processors (DSPs), controllers, microcontrollers, state machines, etc. In some contexts, "processor" can refer to application-specific semiconductors (ASICs), programmable logic devices (PLDs), field-programmable gate arrays (FPGAs), etc. "Processor" means a combination of processing devices, such as a combination of DSP and microprocessor, a combination of multiple microprocessors, a combination of more than one microprocessor and DSP core, or any other such configuration. In addition, "memory" should be interpreted broadly in a way that includes any electronic component capable of storing electronic messages. "Memory" means various types of processor-readable media such as random access memory (RAM), read-only memory (ROM), non-volatile memory (NVRAM), programmable read-only memory (PROM), erasable plannable read-only memory (EPROM), electronically erasable rewritable read-only memory (EEPROM), cache, magnetic or optical data storage device, buffer and so on. If the processor is able to read messages from and/or write messages to memory, the memory is said to be in electronic communication with the processor. The memory integrated in the processor is in an electronic communication state with the processor.

The electronic system and the method of managing errors of an electronic system according to various example embodiments may monitor uncontrollable errors in the operating system that occur in a monitored device in real time and automatically and quickly perform necessary follow-up actions, thereby reducing unnecessary waste of human, time, and computing resources.

In addition, the electronic system and the method of managing errors of an electronic system according to example embodiments may accurately determine the type of uncontrollable error based on a plurality of error determination factors and perform corresponding follow-up measures, thereby efficiently managing errors of the monitored device.

Further, the electronic system and the method of managing errors of an electronic system according to example embodiments may sequentially determine a plurality of error types according to a set priority, thereby reducing an amount of computation required for error management and/or reducing power consumption and necessary follow-up. Accordingly, action can be taken more quickly.

Figure 2:
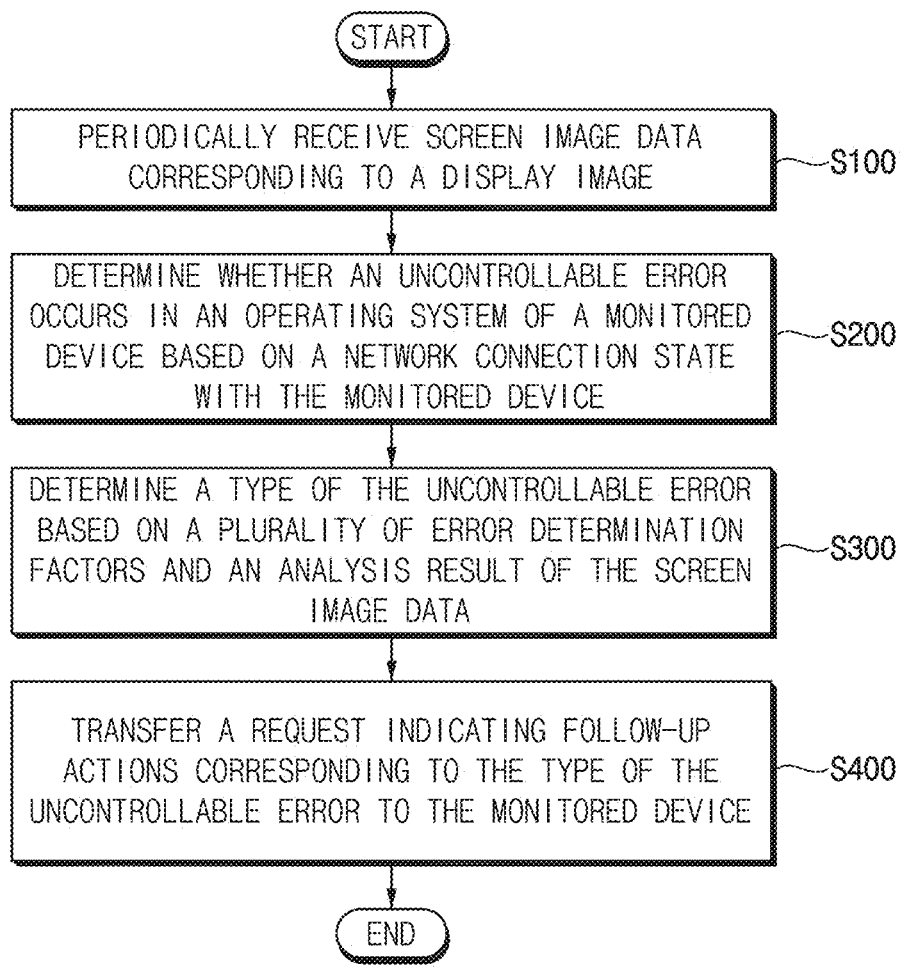
FIG. 2 is a flowchart illustrating a method of managing errors of an electronic system according to example embodiments.

FIG. 1 is a diagram illustrating an electronic system according to example embodiments, and FIG. 2 is a flowchart illustrating a method of managing errors of an electronic system according to example embodiments. An electronic system 10 of FIG. 1 may be referred to as a computing system, a data processing system or the like and may include one or more devices and/or systems.

Referring to FIG. 1, an electronic system 10 may include a communication network 18, one or more management devices (MDV1 and MDV2) 11 and 12, and one or more monitored devices (DEV1, DEV2 and DEV3) 21, 22 and 23 which are connected through the communication network 18. FIG. 1 illustrates the electronic system 10 including two management devices and three monitored devices, but example embodiments are not limited thereto and various numbers of devices may be included in the electronic system 10.

Each of the monitored devices 21, 22 and 23 may include a storage device STR. As will be described below, the monitored devices 21, 22 and 23 may be driven by an operating system OS and respectively generate a display image, respectively. In other words, each of the monitored devices 21, 22, and 23 may have an operating system OS being executed thereon and may generate a display image.

The management devices 11 and 12 and the monitored devices 21, 22 and 23 may communicate with each other through the communication network 18. The communication network 18 may include a wired network, a wireless network, or a combination thereof. For example, the communication network 18 may be implemented using Fiber Channel (FC) or Ethernet, and may be a storage-only network such as a storage area network (SAN). For example, the SAN may be an FC-SAN that uses an FC network and may be implemented according to the FC Protocol (FCP). As another example, the SAN may be an IP-SAN that uses a TCP/IP network and may be implemented according to the iSCSI (SCSI over TCP/IP or Internet SCSI) protocol. As another example, the communication network 18 may be a general network, such as a TCP/IP network. For example, the communication network 18 may be implemented according to protocols such as FC over Ethernet (FCOE), Network Attached Storage (NAS), and NVMe over Fabrics (NVMe-oF).

Each of the management devices 11 and 12 may include an error management module EMM that performs an error management method for an electronic system according to example embodiments. The error management module EMM may be implemented in the form of software, hardware or firmware.

Referring to FIGS. 1 and 2, the management devices 11 and 12 may periodically receive screen image data corresponding to the display images generated by the monitored devices 21, 22 and 23 (S100). For example, the management devices 11 and 12 may periodically receive the screen image data from the monitored devices 21, 22, and 23.

In an example embodiment, the management devices 11 and 12 may periodically receive the screen image data corresponding to the display images through display output ports of the monitored devices 21, 22 and 23. For example, as will be described below with reference to FIGS. 27 and 28, the electronic system 10 may further include a keyboard video mouse (KVM) switch connected between the management devices 11 and 12 and the display output ports of the monitored devices 21, 22 and 23. In this case, the management devices 11 and 12 may periodically receive the screen image data from the KVM switch.

In an example embodiment, as will be described below with reference to FIG. 28, the electronic system 10 may further include display devices that respectively display the display images on screens and camera modules that respectively capture the screens of the display devices. In this case, the management devices 11 and 12 may periodically receive the screen image data from camera modules.

The error management modules EMM of the management devices 11 and 12 may determine whether an uncontrollable error has occurred in the operating system of the monitored device 21, 22 and 23 based on a network connection state with the monitored device 21, 22 and 23 (S200). In an example embodiment, as will be described below, the error management modules EMM may monitor the network connection state between the monitored devices 21, 22 and 23 and the management devices 11 and 12 based on a communication protocol.

The error management modules EMM may determine the type of the uncontrollable error based on a plurality of error determination factors and an analysis result of the screen image data (S300). Example embodiments of determining the error types will be described below with reference to FIGS. 4 through 10.

The error management modules EMM may transfer a request indicating follow-up actions corresponding to the type of the uncontrollable error to the monitored device at which the uncontrollable error occurred (S400). The follow-up actions may include various measures such as collecting data for debugging, rebooting the monitored device, rebooting peripheral devices, etc. The follow-up actions appropriate for the identified error type may be automatically performed by sending a command or request without a human visit.

During the use or verification of solution products such as a solid state drive (SSD) or a universal flash storage (UFS), if the solution product causes an uncontrollable error in the operating system software of the monitored device, in the related art an analysis engineer has to visit the location. After visiting the location and recognizing the defect through the output screen, follow-up actions need to be taken, such as manually extracting a memory dump or rebooting the system to re-perform the evaluation. When an uncontrollable error occurs in the operating system software, monitoring from a remote location is not possible, so an engineer must visit the location in person to check whether an error has occurred.

On the other hand, the electronic system and error management method according to example embodiments may monitor uncontrollable errors in the operating system that occur in the monitored device in real time and automatically and quickly perform necessary follow-up actions, thereby reducing unnecessary waste of human and time resources. In addition, the electronic system and error management method according to example embodiments may accurately determine the type of uncontrollable error based on the plurality of error determination factors and perform corresponding follow-up actions, thereby efficiently detecting errors of the monitored device.

Figure 3:
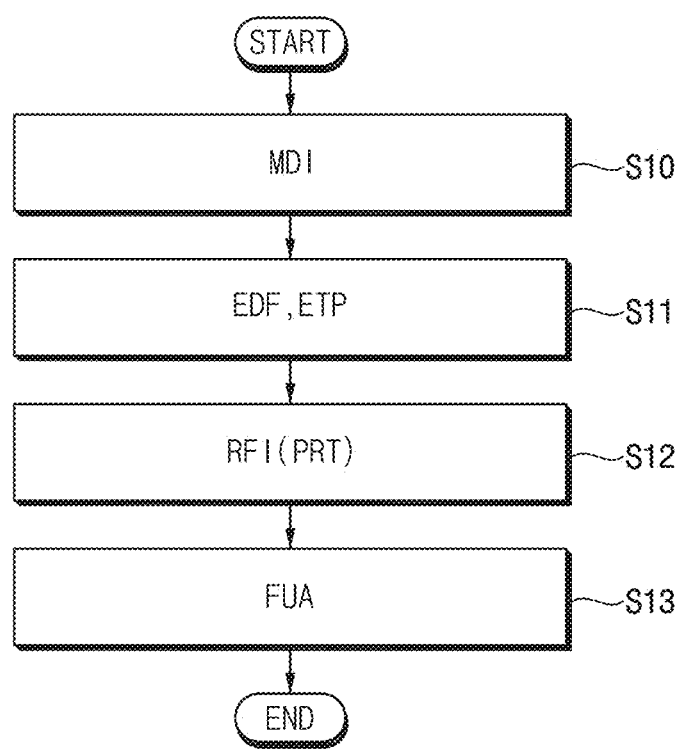
FIG. 3 is a flowchart illustrating procedures to perform a method of managing errors of an electronic system according to example embodiments.

FIG. 3 is a flowchart illustrating procedures to perform a method of managing errors of an electronic system according to example embodiments. FIG. 3 shows a preliminary procedure for real-time monitoring according to example embodiments.

Referring to FIGS. 1 and 3, the management devices 11 and 12 may collect device information MDI of the monitored devices 21, 22 and 23 included in the electronic system 10 (S10). The device information MDI may include the type and version of the operating system of the monitored devices 21, 22 and 23, the display images corresponding to the uncontrollable errors in the operating system, configuration of peripheral devices, configuration of the communication network 18, etc.

The management devices 11 and 12 may set a plurality of error determination factors EDF and a plurality of error types ETP (S11). For example, in some embodiments, the management devices 11 and 12 may store the plurality of error determination factors EDF in association with the plurality of error types ETP. The plurality of error determination factors EDF may correspond to the operating systems of the monitored devices 21, 22 and 23, and appropriate factors may be selected to determine the display images corresponding to uncontrollable errors. Setting of the plurality of error determination factors EDF and the plurality of error types ETP will be described below with reference to FIG. 4.

The management devices 11 and 12 may generate reference information RFI based on the plurality of error determination factors EDF and the plurality of error types ETP (S12). The reference information RFI may be implemented in the form of a referenceable table. The reference information RFI may include values that may serve as criteria for determining whether the uncontrollable error occurs. In an example embodiment, as will be described below with reference to FIGS. 5 and 12, the management devices 11 and 12 may set priorities PRT for the plurality of error types ETP, and the error management modules EMM of the management devices 11 and 12 may sequentially determine whether an uncontrollable error corresponding to one of the plurality of error types ETP has occurred according to the priorities PRT. For example, in some embodiments, the management devices 11 and 12 may store the priorities PRT for the plurality of error types ETP, and the error management modules EMM of the management devices 11 and 12 may sequentially determine whether an uncontrollable error corresponding to one of the plurality of error types ETP has occurred according to the priorities PRT.

The management devices 11 and 12 may set follow-up actions FUA corresponding to each of the plurality of error types ETP (S13). For example, in some embodiments, the management devices 11 and 12 may store follow-up actions FUA corresponding to each of the plurality of error types ETP. The follow-up actions FUA may include various actions such as collecting data for debugging, rebooting the monitored device, rebooting peripheral devices, etc. The follow-up actions FUA may be sent to the corresponding monitored device in the form of a command or a request.

FIG. 4 is a diagram illustrating example embodiments of error determination factors and error types in a method of managing errors of an electronic system according to example embodiments.

Referring to FIG. 4, the error determination factors EDF may be classified into image type factors and a state type factors. The image type factors may include a color CLR of the display image, a quick response (QR) code (QRCD) included in the display image, a character string CHSTR included in the display image, and a marker MKR included in the display image, variation or difference (IMDFF) of the display image over time, etc. The state type factors may include a network connection state NWST between the monitored device and the management device, a power state PWST of the monitored device, etc.

The error types ETP may include blue screen of death BSOD, startup freezing SUFZ, black screen BLKS, and operating system freezing. OSFZ, network error NWERR, etc.

Figure 5:
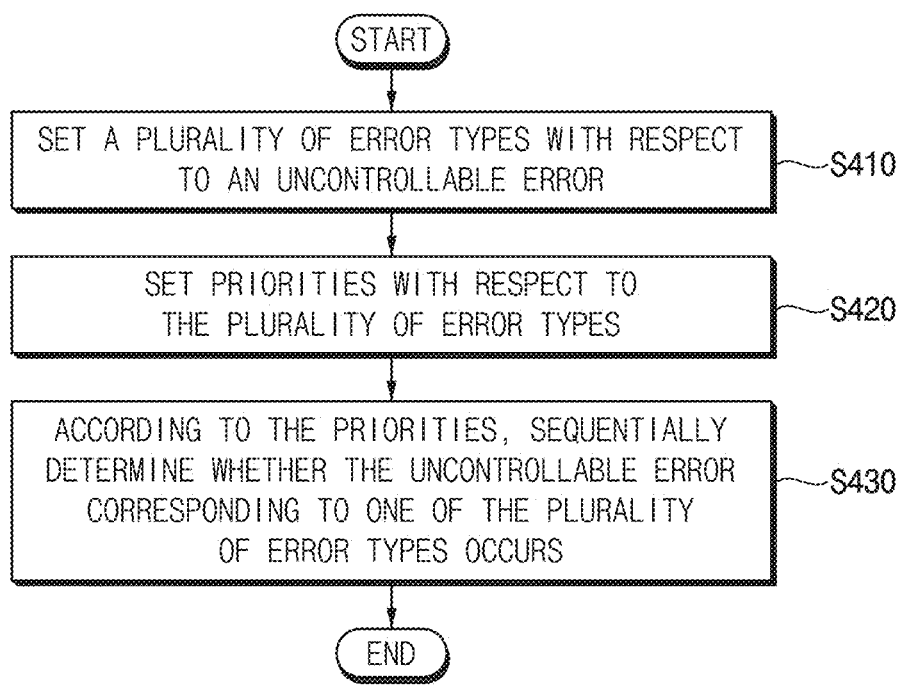
FIG. 5 is a flowchart illustrating determining an error according to example embodiments.

FIG. 5 is a flowchart illustrating an example embodiment of determining an error in a method of managing errors of an electronic system according to example embodiments, and FIGS. 6 through 10 are diagrams illustrating examples of screen image data in a method of managing errors of an electronic system according to example embodiments.

Referring to FIG. 5, the error management module EMM included in the management devices 11 and 12 of FIG. 1 may set the plurality of error types ETP with respect to the uncontrollable errors in the operating system (S410). For example, different operating systems may have different ETPs associated therewith. In some embodiments, the error management module EMM may store the plurality of error types ETP corresponding to the uncontrollable errors for various operating systems. In some embodiments, the error management module EMM may store the plurality of error types ETP corresponding to the uncontrollable errors for a given operating system in use by a monitored device under management. In some embodiments, the error management module EMM may set the priorities PRT with respect to the plurality of error types ETP (S420). For example, in some embodiments, the error management module EMM may store priorities PRT with respect to the plurality of error types. The error management module EMM may sequentially determine whether an uncontrollable error in the operating system corresponding to one of the plurality of error types ETP has occurred according to the priorities PRT (S430).

FIGS. 6 through 10 illustrate example display images or screen images SIMG1 through SIMG10.

There are various operating system software installed on a system, such as Windows™, Linux™, and Android™. When an unintentional fatal error occurs in the operating system software due to internal software problems or problems caused by external devices, an uncontrollable error may occur, which means the operating system can no longer operate. For example, the uncontrollable error may be an error that causes the operating system to be inoperable such that the operating system no longer operates such that it may be difficult for a local operation to overcome the error and/or a remote or external intervention may be required to overcome the error. The phenomenon and types vary depending on the operating system software. Hereinafter, the description will mainly focus on the Windows™ operating system, but example embodiments are not limited to a specific operating system.

Figure 6:
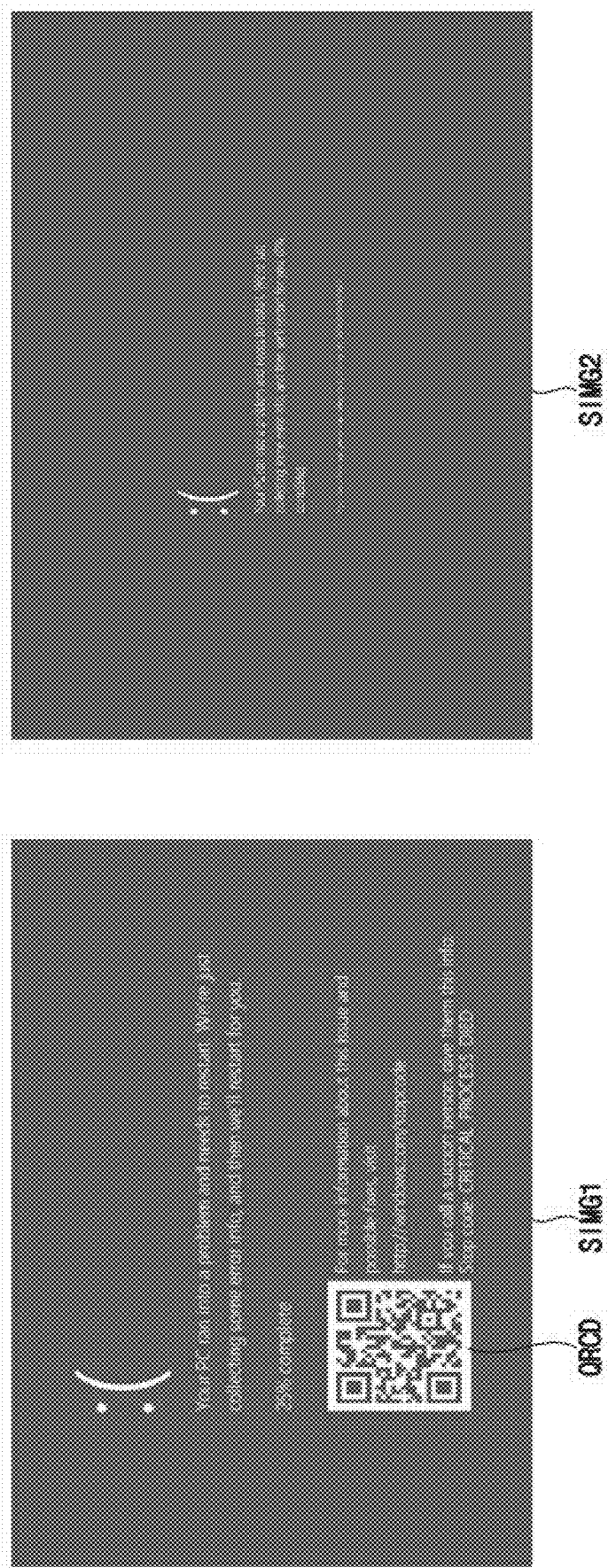
Figure 10:
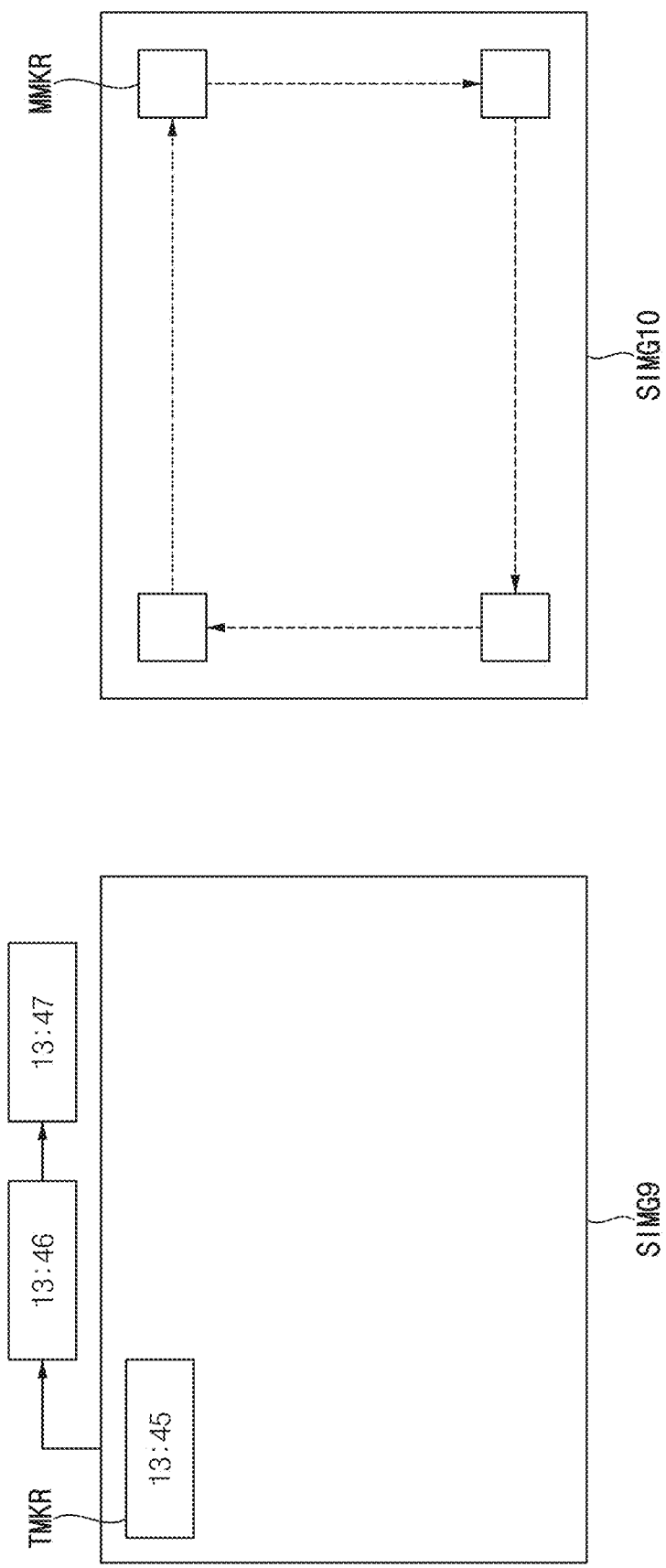

FIG. 6 shows screen images SIMG1 and SIMG2 corresponding to the error type of the blue screen of death (BSOF), and FIG. 7 shows screen images SIMG3 and SIMG4 corresponding to the error type of the black screen (BLKS). FIG. 8 shows screen images SIMG5 and SIMG6 corresponding to the error type of startup freezing (SUFZ), FIG. 9 shows screen images SIMG7 and SIMG8 corresponding to the error type of the operating system freezing (OSFZ), and FIG. 10 shows screen images SIMG9 and SIMG10 including a marker (MKR). The startup freezing SUFZ refers to a state in which the operation of a monitored device is stopped while power is applied and booting is in progress. The operating system freezing OSFZ refers to a state in which the operation has been stopped for a reason such as memory crashes, excessive processing capacity, etc. while the operating system is running after booting is completed. In cases such as when the monitored device is turned off or when a network error occurs, it may be difficult for the management device to check the state of the monitored device and distinguish the state from a screen image caused by an uncontrollable error in the operating system.

A QR code QRCD may exist in the uncontrollable error screens, such as the screen image SIMG1 in FIG. 6. In such cases, the presence or absence of the QR code (QRCD) and the code number may be collected through an open source vision library, etc. Since the QR code QRCD contains its own error correction technique, highly reliable information may be collected even when the screen information is low-resolution or the screen capturing angle is not straight, and may be usefully used as an error determination factor.

A character string CHSTR may exists in the uncontrollable error screens, such as the screen images SIMG1, SIMG2, SIMG5 and SIMG6 in FIGS. 6 and 8. In this case, the character string CHSTR may be detected using optical character recognition (OCR) of the open source vision library. If the screen information is low-resolution or the screen capturing angle is not from the front, the character recognition rate may decrease, so considering accuracy, the presence of the character string CHSTR alone may be referred to as an error determination factor.

The uncontrollable error screen may be largely divided into blue screen images SIMG1 and SIMG2 and black screen images SIMG3, SIMG4, SIMG5 and SIMG6. The screen image SIMG3 is predominantly black but contains a significant percentage of blue. Through the color identification of the open source vision library, only the dominant color (CLR in FIG. 4) may be classified into two types and used as an error determination factor. More detailed color specification is possible, but detailed color specification may be less accurate since colors are likely to be displayed differently depending on the resolution of the screen image, the screen capturing angle, and lighting conditions.

In most cases where uncontrollable errors occur, the screen image remains in a frozen state, as shown in the screen images SIMG7 and SIMG8 in FIG. 9. Therefore, it may be determined that the screen is frozen by analyzing the differences between the two screens extracted at regular time intervals, and the frozen screen may be used as an error determination factor. Using the open source image comparison tool, the level of the image difference (IMDFF in FIG. 4) between the two screens over time may be secured as a ratio (e.g., %) and it may be determined that the two screens are the same when the difference between the screen image is below a certain level for a set period of time.

Although the differences between screens may be used to some extent to distinguish whether a screen is in a frozen state, there may be cases where there is little difference between screens even in situations where the operating system software is running normally. In such a situation, differences between screens may be caused by running a marker that causes differences between screens on the monitored device and changing the marker (MKR in FIG. 4) that appears on the screen at certain times. The marker software must always remain at the top of the operating system software graphical user interface (GUI) and may run automatically when the system reboots.

FIG. 10 illustrates a timer type marker TMKR and a moving marker MMKR as examples. The timer type marker TMKR is a marker whose numbers change at regular intervals at a fixed location. In this case, differences in screen images over time may be determined through image comparison or OCR. The moving marker MMKR is a marker that moves at regular intervals, and difference of the marker locations in screen images over time may be determined through image comparison.

The power state (PWST in FIG. 4) of the monitored device may be secured using a baseboard management controller (BMC), a power measurement board, etc., which will be described below with reference to FIG. 14.

The network connection status (NWST in FIG. 4) of the system may be extracted using technologies such as Ping, secure shell (SSH), and Windows™ Remote Desktop, and may be used as an initial determination factor to attempt to determine uncontrollable errors.

Figure 11:
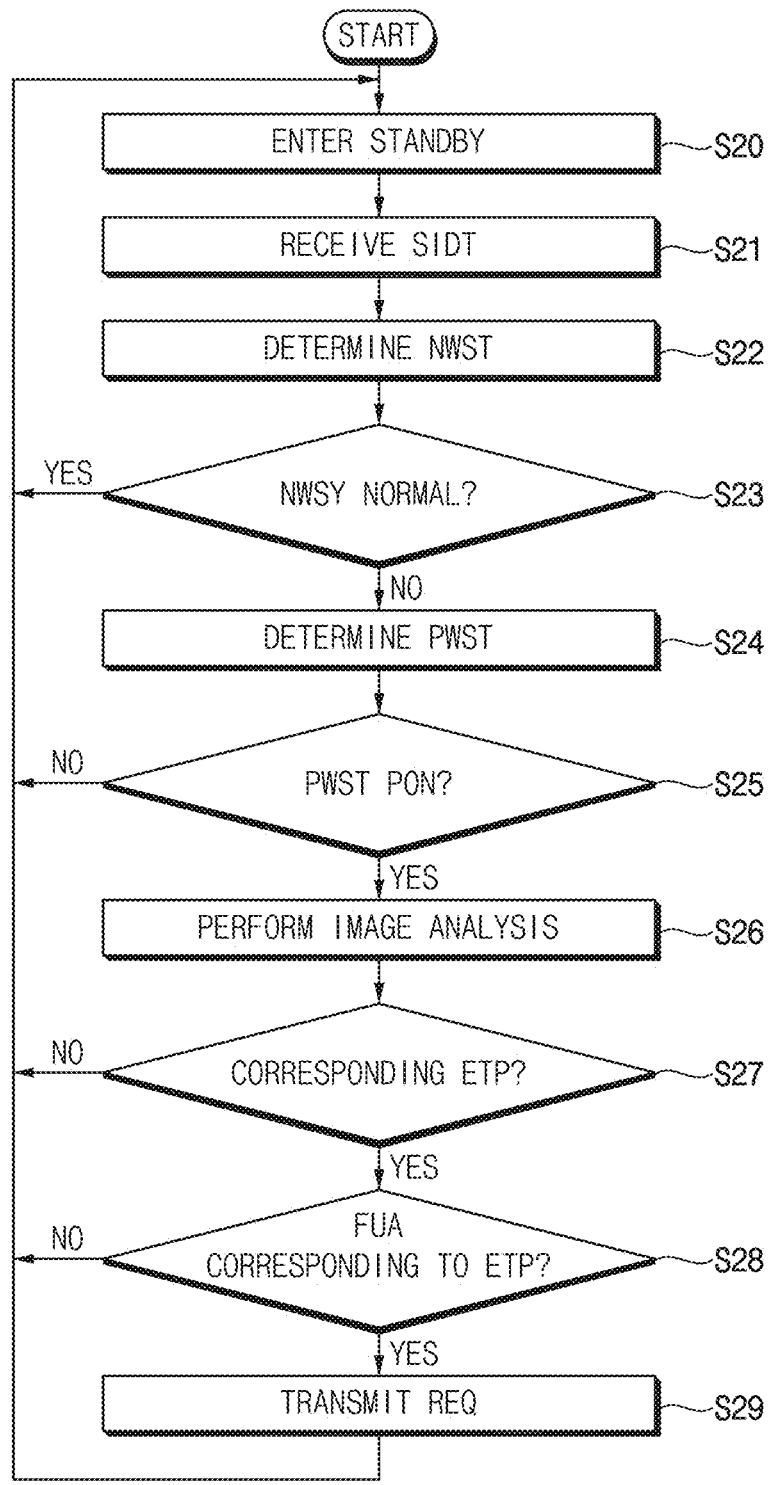
FIG. 11 is a flowchart illustrating a method of managing errors of an electronic system according to example embodiments.

FIG. 11 is a flowchart illustrating a method of managing errors of an electronic system according to example embodiments.

Referring to FIG. 11, the management device (e.g., 11 in FIG. 1) enters a standby state (STANDBY) (S20). During the standby state (STANDBY), the management device 11 waits for a certain period of time until the management device 11 receives screen image data SIDT corresponding to the display image periodically generated by the monitored device (e.g., 21 in FIG. 1) (S21).

The management device 11 may determine the network connection state NWST (S22). For example, the management device 11 may determine the network connection state NWST by attempting communication with a communication module, which will be described below with reference to FIG. 14. The management device 11 may determine if the network connection state NWST is normal (S23). If the network connection state NWST is normal (S23: YES), the management device 11 may determine that no uncontrollable error has occurred and return to operation S20.

If the network connection state NWST is not normal (S23: NO), the management device 11 may determine the power status PWST (S24). For example, if communication between the management device 11 and the monitored device 21 is not possible, the management device 11 may determine that the network connection state NWST is not normal. For example, in some embodiments, the management device 11 may receive information about the power state PWST from the BMC, which will be described below with reference to FIG. 14.

The management device 11 may determine whether the power status PWST is in a power-on state PON (S25). If the power state PWST is not the power-on state PON (S25: NO), the management device 11 may determine that an uncontrollable error has not occurred and return to operation S20. Depending on embodiments, the power of the monitored device 21 may be set to always be in an on state, and in this case, the management device 11 may transmit a reboot request to the monitored device 21.

If the power state PWST is the power-on state PON (S25: YES), the management device 11 may perform image analysis (S26). For example, in some embodiments, the management device 11 may perform image analysis based on the screen image data SIDT. The image analysis may be performed based on the plurality of error determination factors EDF as described above. In an example embodiment, the management device 11 may perform image analysis to comply with the priorities as will be described below with reference to FIG. 12.

The management device 11 may determine whether there is a corresponding error type ETP (S27). For example, in some embodiments, the management device 11 may determine whether there is an error type ETP that corresponds to the screen image data SIDT. If there is no corresponding error type ETP as a result of image analysis (S27: NO), the management device 11 may return to operation S20. According to some example embodiments, if the management device 11 cannot determine the corresponding error type ETP, the management device 11 may determine that it is a network error NWERR and notify a manager.

If the corresponding error type ETP is determined as the result of the image analysis (S27: YES), the management device 11 may determine whether there is a follow-up action FUA corresponding to the determined error type ETP (S28). If there is a corresponding follow-up action FUA (S28: YES), the management device 11 may transmit a request REQ (S29). For example, the management device 11 may transmit the request REQ indicating the follow-up action FUA to the monitored device 21 and return to operation S20. If there is no corresponding follow-up action FUA (28: NO), the management device 11 may return to operation S20.

Figure 12:
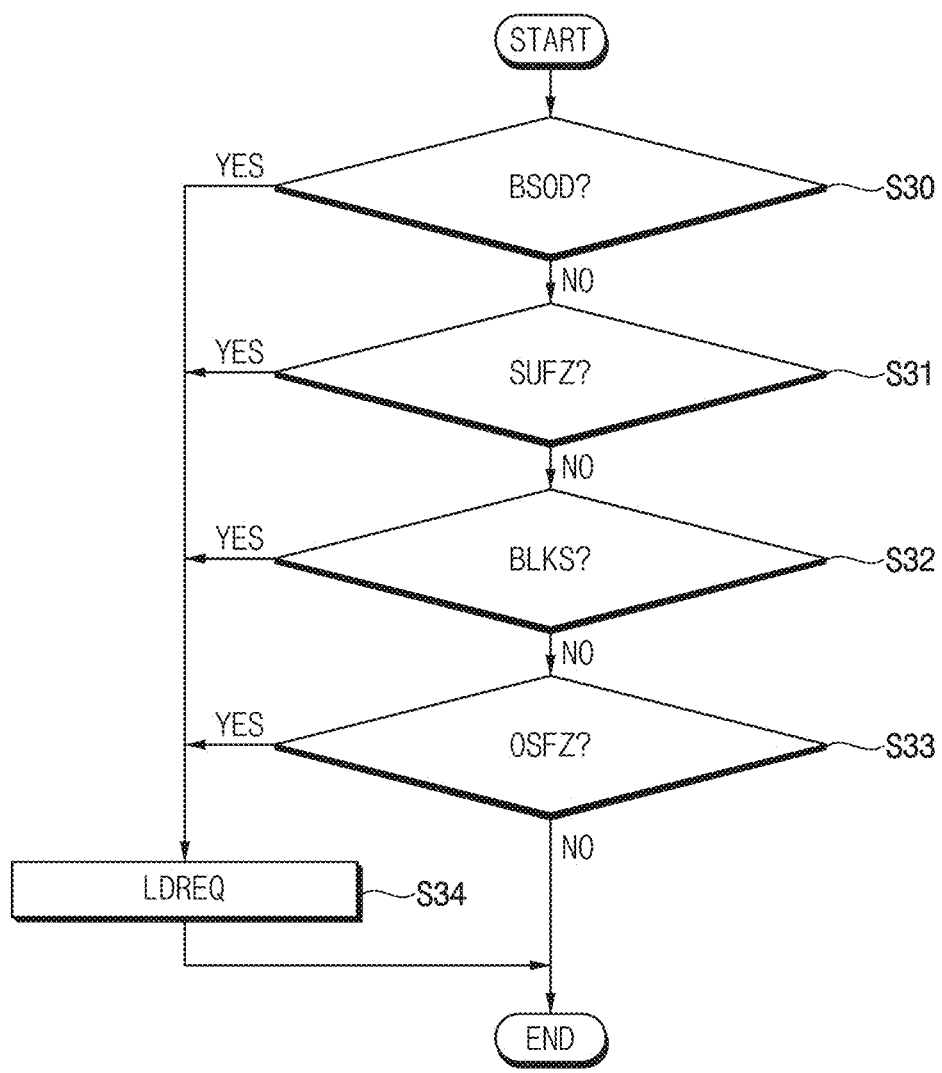
FIG. 12 is a flowchart illustrating determining an error according to example embodiments.

FIG. 12 is a flowchart illustrating an example embodiment of determining an error in a method of managing errors of an electronic system according to example embodiments.

Referring to FIG. 12, the error management module EMM of the management device 11 may determine the type of the uncontrollable error in the order of the blue screen of death BSOD, the startup freezing SUFZ, the black screen BLKS, and the operating system freezing OSFZ.

First, the error management module EMM may determine whether the error type is the blue screen BSOD) in operation S30, and if the error type corresponds to the blue screen of death BSOD (S30: YES), the error management module EMM may transfer a log dump request LDREQ to the monitored device 21 (S34).

Second, if the error type does not correspond to the blue screen of death BSOD (S30: NO), the error management module EMM may determine whether the error type is the startup freezing SUFZ in operation S31 and, if the error type corresponds to the startup freezing SUFZ (S31: YES), the error management module EMM may transfer the log dump request LDREQ to the monitored device 21 (S34).

Third, if the error type does not correspond to the startup freezing SUFZ (S31: NO), the error management module EMM may determine whether the error type is the black screen BLKS in operation S32 and, if the error type corresponds to the black screen BLKS (S32: YES), the error management module EMM may transfer the log dump request LDREQ to the monitored device 21 (S34).

Fourth, if the error type does not correspond to the black screen BLKS (S32: NO), the error management module EMM may determine whether the error type is the operating system freezing OSFZ in operation S33 and, if the error type corresponds to the operating system freezing OSFZ (S33: YES), the error management module EMM may transfer the log dump request LDREQ to the monitored device 21 (S34).

As such, the electronic system and error management method according to example embodiments may sequentially determine the plurality of error types according to the priorities of the error types (ETP), thereby reducing the amount of calculation required for error management, reducing power consumption and rapidly performing the follow-up actions.

FIG. 12 shows an example embodiment in which four error types are sequentially determined according to the priorities through image analysis, but example embodiments are not limited thereto. The error determination begins in order from highest priority to lowest priority, and when an uncontrollable error is confirmed, the error determination is terminated without further processing of additional error types. In general, error types with high accuracy of errors that may be distinguished through the error determination factors are assigned higher priority, so once an error is determined in the priority order, there is no need to compare the conditions in the lower priority order anymore. In addition, most errors may be identified through the error determination factors in the higher priority, and the errors that are difficult to distinguish may be detected in the lower priority.

Figure 13:
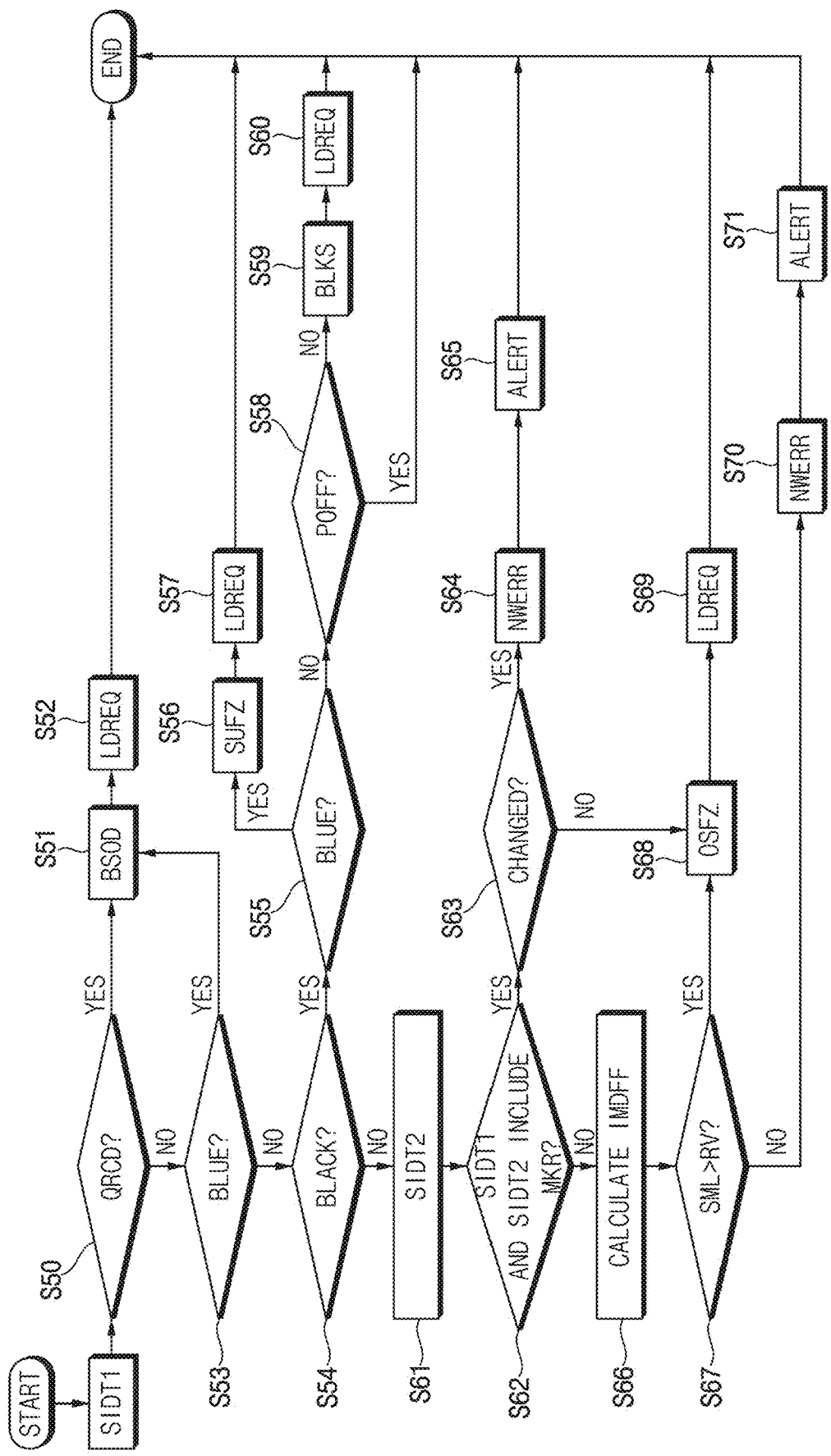
FIG. 13 is a flowchart illustrating a method of managing errors of an electronic system according to example embodiments.

FIG. 13 is a flowchart illustrating a method of managing errors of an electronic system according to example embodiments.

Referring to FIG. 13, the management device 11 may periodically receive the screen image data SIDT1 and determine whether the screen image data SIDT1 includes a QR code QRCD indicating the blue screen of death BSOD based on the analysis result of the screen image data SIDT1 (S50). If a QR code QRCD is included (S50: YES), the management device 11 may determine the error type as the blue screen of death BSOD (S51) and transfer a log dump request LDREQ to the monitored device 21 (S52).

If the QR code QRCD is not included (S50: NO), the management device 11 may determine whether the dominant color of the screen image data SIDT1 is blue based on the analysis result (S53). If the dominant color is blue (S53: YES), the management device 11 may determine the error type as the blue screen of death BSOD (S51) and transfer the log dump request LDREQ to the monitored device 21 (S52).

If the dominant color is not blue (S53: NO), the management device 11 may determine whether the dominant color of the screen image data SIDT1 is black based on the analysis result (S54). When the dominant color is black (S54: YES), the management device 11 may determine whether the screen image data SIDT1 includes a blue portion as shown in the screen image SIMG3 of FIG. 7 (S55). If the blue portion is included (S55: YES), the management device 11 may determine the error type as the startup freezing SUFZ (S56) and transfer the log dump request LDREQ to the monitored device 21 (S57).

If the blue portion is not included (S55: NO), the management device 11 may determine whether the power state of the monitored device 21 is the power off state POFF (S58). If the monitored device 21 is not in the power off state POFF (S58: NO), the management device 11 may determine the error type as the black screen BLKS (S59) and transfer the log dump request LDREQ to the monitored device 21 (S60). In some example embodiments, in the case of the power off state POFF (S58: YES), it may be determined that the monitored device 21 is in the normal state. In some embodiments, in the case of the power off state POFF (S58: YES), it may be determined that the monitored device 21 is in an abnormal state and a reboot request RBREQ may be transmitted to the monitored device 21.

If the dominant color is not black (S54: NO), the management device 11 may receive the next screen image data SIDT2 (S61) and perform image comparison based on the screen image data SIDT1 and SIDT2. That is, the management device 11 may determine whether the screen image data SIDT1 and SIDT2 includes a market MKR based on the image comparison (S62).

If the screen image data SIDT1 and SIDT2 includes a marker MKR (S62: YES), the management device 11 may determine whether the marker MKR has changed based on the image comparison result (S63). If the marker MKR is changed (S63: YES), the management device 11 may determine the error type to be a network error NWERR (S64) and notify the manager of the alert (S65). Notification methods may be implemented in various ways, such as alerting sounds, alerting screens, and email transmission. If the marker MKR is not changed (S63: NO), the management device 11 may determine the error type as the operating system freezing OSFZ (S68) and transfer the log dump request LDREQ to the monitored device 21 (S69).

If the marker MKR is not included (S62: NO), the management device 11 may calculate the image difference IMDFF of the screen image data SIDT1 and SIDT2 (S66). If the image difference IMDFF indicates that a similarity SML of the images is greater than a reference value RV (S67: YES), the management device 11 may determine the error type as the operating system freezing OSFZ (S68) and transfer the log dump request LDREQ to the monitored device 21 (S69). If the similarity SML is not greater than the reference value RV (S67: NO), the management device 11 may determine the error type as the network error NWERR (S70) and notify the manager of the alert (S71).

Figure 14:
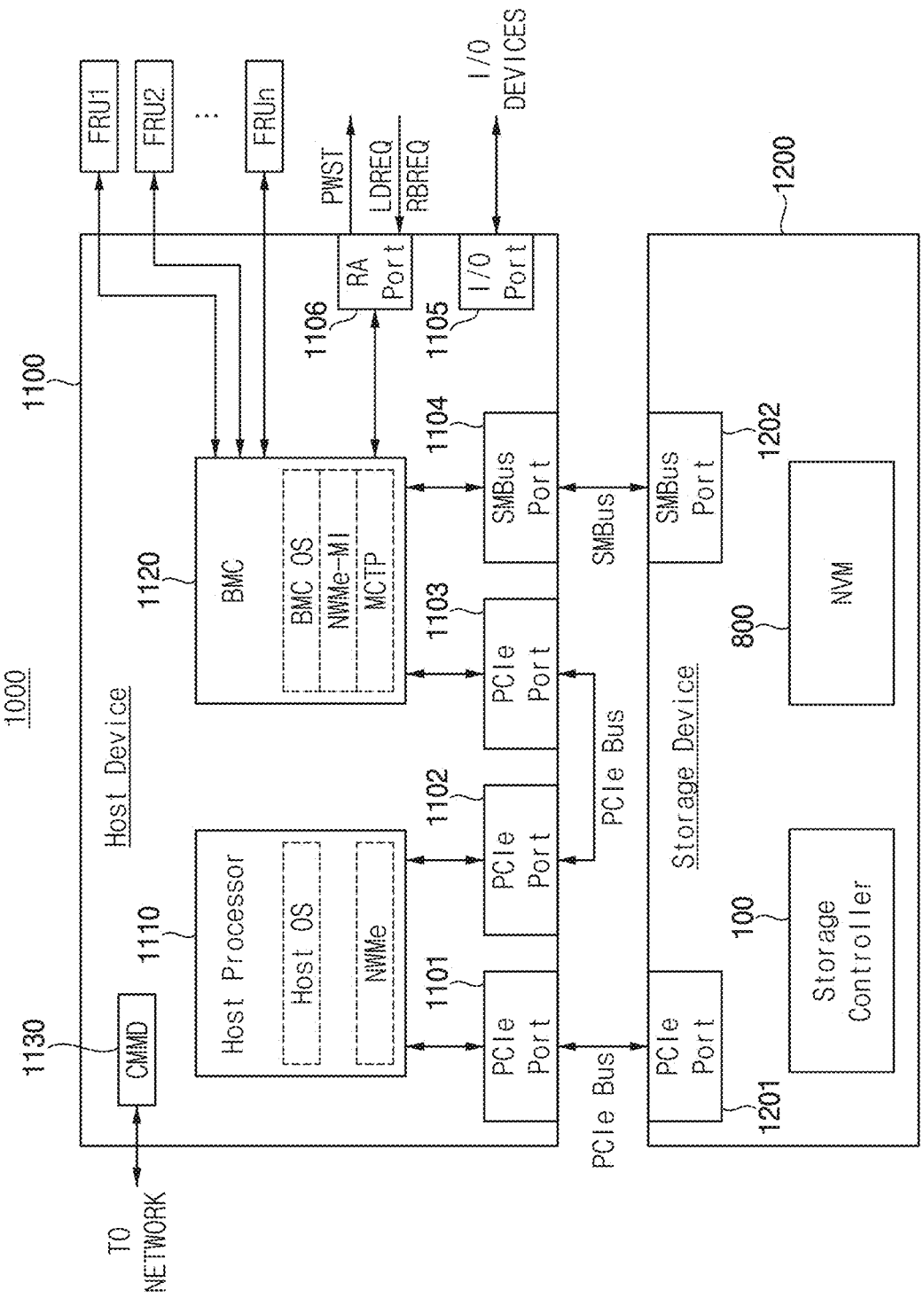
FIG. 14 is a block diagram illustrating a monitored device included in an electronic system according to example embodiments.

FIG. 14 is a block diagram illustrating an example embodiment of a monitored device included in an electronic system according to example embodiments.

Referring to FIG. 14, a monitored device 1000 may include a host device 1100 and a storage device 1200. For example, the monitored device 1000 may be one of electronic devices such as a desktop computer, a laptop computer, a tablet, a smart phone, a wearable device, a video game console, a workstation, one or more servers, an electric vehicle, a home appliance, a medical device, etc.

The host device 1100 includes a host processor 1110, a baseboard management controller (BMC) 1120, a communication module (CMMD) 1130, PCIe ports 1101, 1102 and 1103, a system management bus (SMBus) port 1104, an input-output port (I/O Port) 1105, and a remote access port (RA Port) 1106.

The host processor 1110 may include an application layer such as a host operating system (OS) and a protocol layer such as Non-Volatile Memory Express (NVMe). The host OS is driven by the host processor 1110 and may control the overall operation of the host device 1100. In other words the host OS is executed by the host processor 1110 and may control the overall operation of the host device 1100. The NVMe is driven by the host processor 1110 such that the host device 1100 may communicate with the storage device 1200. In other words, the NVMe is executed by the host processor 1110 so that the host device 1100 may communicate with the storage device 1200. The NVMe may be a register-level interface that governs how host software running on the host device 1100 communicates with the storage device 1200 through a PCIe (Peripheral Component Interconnect Express) bus. The host processor 1110 may be implemented as a general-purpose processor, a dedicated processor, or an application processor including one or more processor cores.

The BMC 1120 may include an application layer such as BMC OS, a protocol layer such as NVMe management interface (NVMe-MI), and a transport layer such as Management Component Transport Protocol (MCTP). The BMC OS may control the overall operation of the BMC 1120. The NVMe-MI may provide one management console that supports an in-band management function, an out-of-band management function, and various OS of the monitored device 1000 that operates based on the NVMe. The MCTP may define a message transfer protocol.

The BMC 1120 may monitor the status of sensors installed in each hardware, such as the host processor 1110, a fan, and a power supply device, etc. For example, the BMC 1120 may collect data about the physical state of field replaceable units FRUs (e.g., FRU1, FRU2, . . . , FRUn) of the host device 1100 (or connected to the host device 1100). Here, the FRU may refer to a component that may be easily removed or replaced without replacing or repairing the entire monitored device 1000. For example, The FRUs may include fans, various sensors, power supplies, etc. In this case, the BMC 1120 may collect data (hereinafter referred to as FRU data) regarding fan speed, temperature of each component of the host device 1100, and power supply voltage of the power supply device. The BMC 1120 and the FRUs may be connected through a system management bus SMBus.

The BMC 1120 may provide the FRU data to the host processor 1110 through the PCIe port 1103, the PCIe bus, and the PCIe port 1102. The host processor 1110 may provide the FRU data to the storage device 1200 through the PCIe port 1101, the PCIe bus, and the PCIe port 1201. In some embodiments, the BMC 1120 may provide the FRU data to the SMBus connected to the storage device 1200 according to a predetermined protocol.

Each of the PCIe ports 1102 and 1103 may include a physical layer and/or a logical layer configured to transmit, receive and process data, signals, and/or packets such that the host processor 1110 and the BMC 1120 may communicate with each other. Each of the PCIe ports 1101 and 1202 may include the same or similar layers such that the host processor 1110 and the storage controller 100 may communicate with each other, and each of the SMBus 1104 and 1202 may include the same or similar layers such that the BMC 1120 and the storage controller 100 may communicate with each other. For example, each of the PCIe ports 1101, 1102, 1103 and 1201, and SMBus ports 1104 and 1202 may include an NVMe management endpoint, where the NVMe management endpoint may be an MCTP endpoint.

In some embodiments, the BMC 1120 may perform a system event log function. For example, when an event occurs in which the value of data collected from a fan, power supply, etc. exceeds the threshold, and/or an event such as a request to power-on or power-off the power of the monitored device 1000 occurs. The log of the occurred events may be stored in a separate memory (not shown) within the host device 1100.

Although not shown in the drawing, the monitored device 1000 may further include a working memory and a user interface. In this case, the working memory may store data used in the operation of the monitored device 1000. For example, working memory may temporarily store data collected (or processed) by BMC 1120 as well as data processed (or to be processed) by host processor 1110. For example, the working memory may be volatile memory such as Static Random Access Memory (SRAM), Dynamic RAM (DRAM), Synchronous RAM (SDRAM), and/or Phase-change RAM (PRAM), Magneto-resistive RAM (MRAM), or nonvolatile memory such as Resistive RAM (ReRAM), Ferro-electric RAM (FRAM), etc.

The communication module (CMMD) 1130 may support at least one of various wireless/wired communication protocols to communicate with an external device/system of the monitored device 1000. The user interface may include various input/output interfaces to mediate communication between the user and the monitored device 1000. If an uncontrollable error occurs in the operating system of the monitored device 1000, communication with the management device may become impossible and the aforementioned network error NWERR may occur.

The host device 1100 may be connected to input-output devices such as a display device, keyboard, and mouse through the input-output port 1105. The display output port may be implemented as a portion of the input-output port 1105. In some embodiments, the host device 1100 may be connected to the management device through the remote access (RA) port 1106. The BMC 1120 may receive a log dump request LDREQ, a reboot request RBREQ, etc. from the management device through the remote access port 1106.

The storage device 1200 may include a storage controller 100 and a non-volatile memory device (NVM) 800. The storage device 1200 may acquire the FRU data through various paths. For example, the storage device 1200 may receive the FRU data from the host processor 1110 through a PCIe bus connected to the PCIe port 1201. For example, reception of FRU data may be performed upon request from the host processor 1110. In some embodiments, the storage device 1200 may access the SMBus connecting the SMBus ports 1104 and 1202 when an error occurs in the storage device 1200 and obtain the FRU data from the SMBus. The storage device 1200 may store error information of the storage device 1200 itself and FRU information that may be related to an error of the host device 1100 together in the nonvolatile memory device 800. As a result, it may be easily confirmed through debugging that an error in the storage device 1200 is caused by an error in the host device 1100.

In this disclosure, it is described that the BMC 1120 and the FRUs are connected via the SMBus, and the SMBus port 1104 of the host device 1100 and the SMBus port 1202 of the storage device 1200 are connected via the SMBus, but example embodiments are not limited thereto. For example, in some embodiments, the storage device 1200 and the host device 1100 may be connected through an Inter-Integrated Circuit (I2C) bus.

Figure 15:
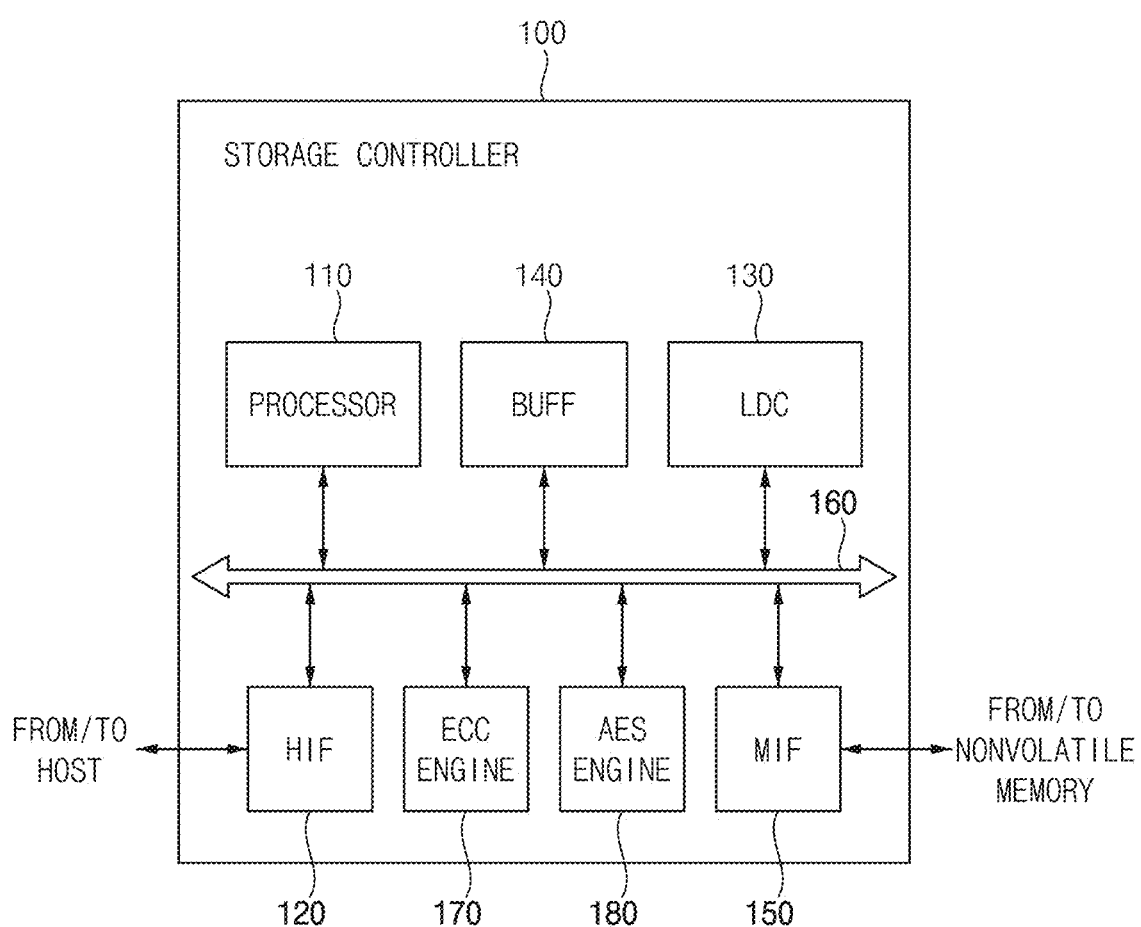
FIG. 15 is a block diagram illustrating an example of a storage controller included in the monitored device of FIG. 14, according to an example embodiment.

FIG. 15 is a block diagram illustrating an example embodiment of a storage controller included in the monitored device of FIG. 14.

Referring to FIG. 15, the storage controller 100 may include a processor 110, a buffer memory (BUFF) 140, a log dump controller (LDC) 130, a host interface (HIF) 120, an error correction code (ECC) engine 170, a memory interface (MIF) 150, an advanced encryption standard (AES) engine 180, and an internal bus system 160 that connects the components in the storage controller 100.

The processor 110 may control an operation of the storage controller 100 in response to commands received via the host interface 120 from a host device (e.g., the host device 1100 in FIG. 14). For example, the processor 110 may control an operation of a storage device (e.g., the storage device 1200 in FIG. 14), and may control respective components by employing firmware for operating the storage device.

The buffer memory (BUFF) 140 may store instructions and data executed and processed by the processor 110. For example, the buffer memory 140 may be implemented with a volatile memory, such as a DRAM, a SRAM, a cache memory, or the like.

The ECC engine 170 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), or the like. In some example embodiments, the ECC engine 170 may perform ECC encoding and ECC decoding using above-described codes or other error correction codes.

The host interface 120 may provide physical connections between the host device 1100 and the storage device 1200. The host interface 120 may provide an interface that corresponds to a bus format of the host device 1100 for communication between the host device 1100 and the storage device 1200. In some example embodiments, the bus format of the host device 1100 may be a small computer system interface (SCSI) or a serial attached SCSI (SAS) interface. In some example embodiments, the bus format of the host device may be a USB, a peripheral component interconnect (PCI) express (PCIe), an advanced technology attachment (ATA), a parallel ATA (PATA), a SATA, a nonvolatile memory (NVM) express (NVMe), or other format.

The memory interface (MIF) 150 may exchange data with a nonvolatile memory device (e.g., the nonvolatile memory device 800 in FIG. 14). The memory interface 150 may transfer data to the nonvolatile memory device 800, and/or may receive data read from the nonvolatile memory device 800. In some example embodiments, the memory interface 150 may be connected to the nonvolatile memory device 800 via one channel. In other example embodiments, the memory interface 150 may be connected to the nonvolatile memory device 800 via two or more channels. The memory interface 150 may be configured to comply with a standard protocol, such as Toggle or open NAND flash interface (ONFI).

The AES engine 180 may perform at least one of an encryption operation and a decryption operation on data input to the storage controller 100 using a symmetric-key algorithm. The AES engine 180 may include an encryption module and a decryption module. For example, the encryption module and the decryption module may be implemented as separate modules. In another example, one module capable of performing both encryption and decryption operations may be implemented in the AES engine 180.

The log dump controller (LDC) 130 may control a log dump operation as will be described below with reference to FIG. 19.

Figure 16:
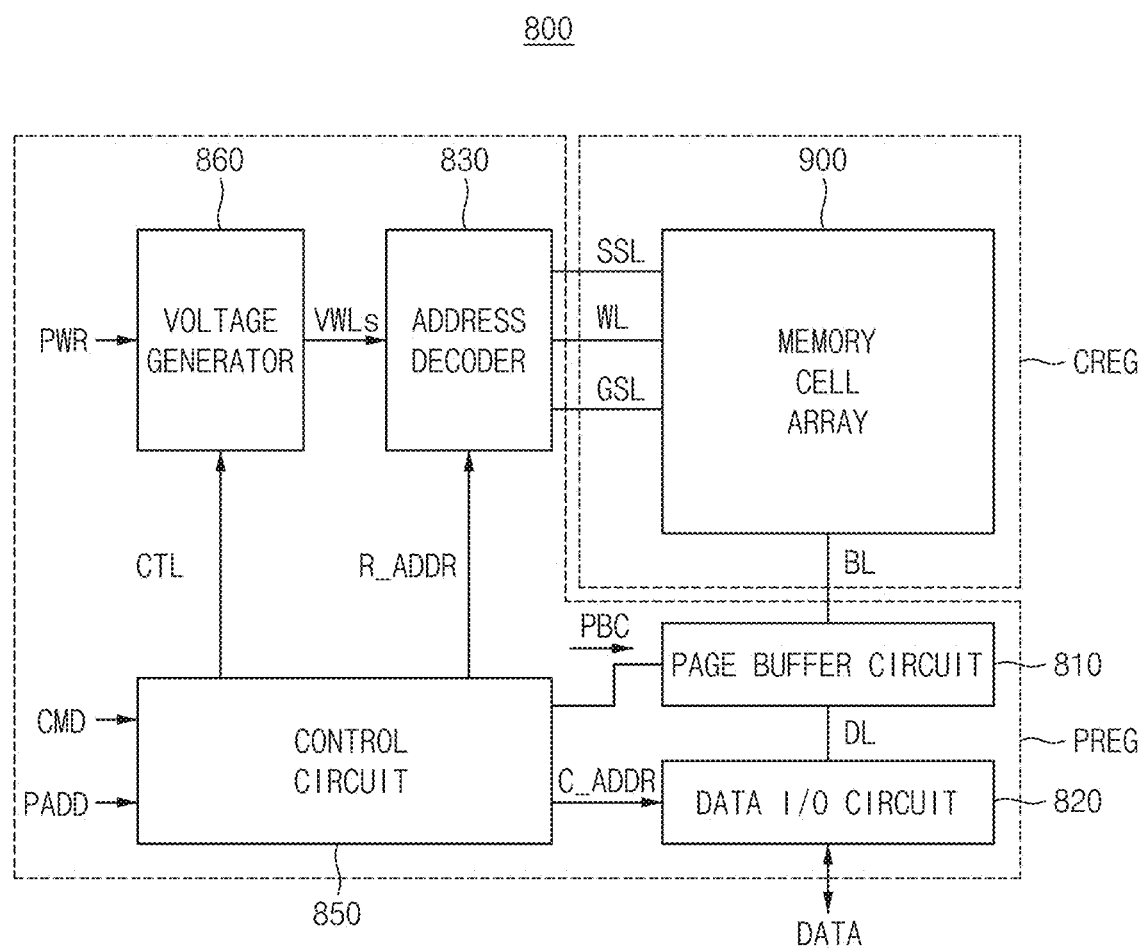
FIG. 16 is a block diagram illustrating an example of a nonvolatile memory device included in the monitored device of FIG. 14.

FIG. 16 is a block diagram illustrating an example embodiment of a nonvolatile memory device included in the monitored device of FIG. 14.

Referring to FIG. 16, the nonvolatile memory device 800 may include a memory cell array 900, a page buffer circuit 810, a data input/output (I//O) circuit 820, an address decoder 830, a control circuit 850, and a voltage generator 860. In some example embodiments, the nonvolatile memory device 800 may have a cell over periphery (COP) structure in which a memory cell array is arranged over peripheral circuits. In this case, the memory cell array 900 may be formed in a cell region CREG, and the page buffer circuit 810, the data I/O circuit 820, the address decoder 830, the control circuit 850, and the voltage generator 860 may be formed in a peripheral region PREG.

The memory cell array 900 may be coupled to the address decoder 830 through string selection lines SSL, wordlines WL, and ground selection lines GSL. The memory cell array 900 may be coupled to the page buffer circuit 810 through a bitlines BL. The memory cell array 900 may include memory cells coupled to the wordlines WL and the bitlines BL. In some example embodiments, the memory cell array 900 may be a three-dimensional memory cell array, which may be formed on a substrate in a three-dimensional structure (or a vertical structure). In this case, the memory cell array 900 may include cell strings (e.g., NAND strings) that are vertically oriented such that at least one memory cell is located over another memory cell.

The control circuit 850 may receive a command signal CMD and an address signal PADD from a memory controller, and may control erase, program, and read operations of the nonvolatile memory device 800 in response to (or based on) at least one of the command signal CMD and the address signal PADD. The erase operation may include performing a sequence of erase loops, and the program operation may include performing a sequence of program loops. Each program loop may include a program operation and a program verification operation. Each erase loop may include an erase operation and an erase verification operation. The read operation may include a normal read operation and data recover read operation.

In some example embodiments, the control circuit 850 may generate a control signals CTL used to control the operation of the voltage generator 860, and may generate a page buffer control signal PBC for controlling the page buffer circuit 810, based on the command signal CMD, and may generate a row address R_ADDR and a column address C_ADDR based on the address signal PADD. The control circuit 850 may provide the row address R_ADDR to the address decoder 530, and may provide the column address C_ADDR to the data I/O circuit 520.

The address decoder 830 may be coupled to the memory cell array 900 through the string selection lines SSL, the wordlines WL, and the ground selection lines GSL. The voltage generator 860 may generate wordline voltages VWL, which are used for the operation of the memory cell array 900 of the nonvolatile memory device 800, based on the control signals CTL and the power PWR from the memory controller. The page buffer circuit 810 may be coupled to the memory cell array 900 through the bitlines BL. The page buffer circuit 810 may include multiple buffers. The data I/O circuit 820 may be coupled to the page buffer circuit 810 through data lines DL.

Figure 17:
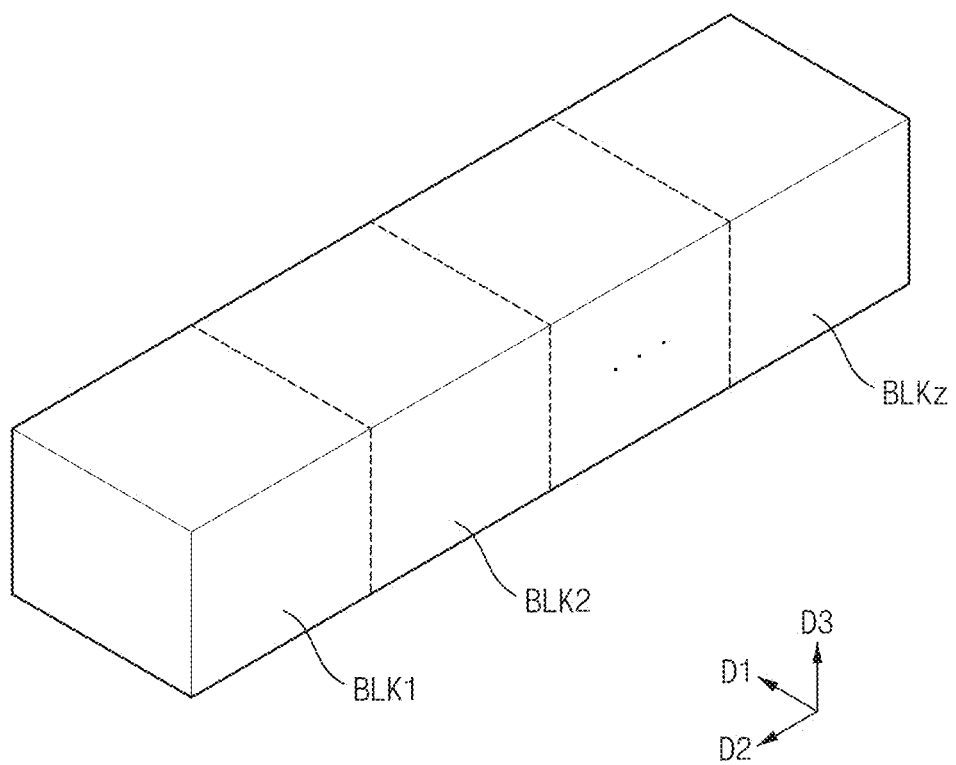
FIG. 17 is block diagram illustrating a memory cell array included in the nonvolatile memory device of FIG. 16, according to an example embodiment.
Figure 18:
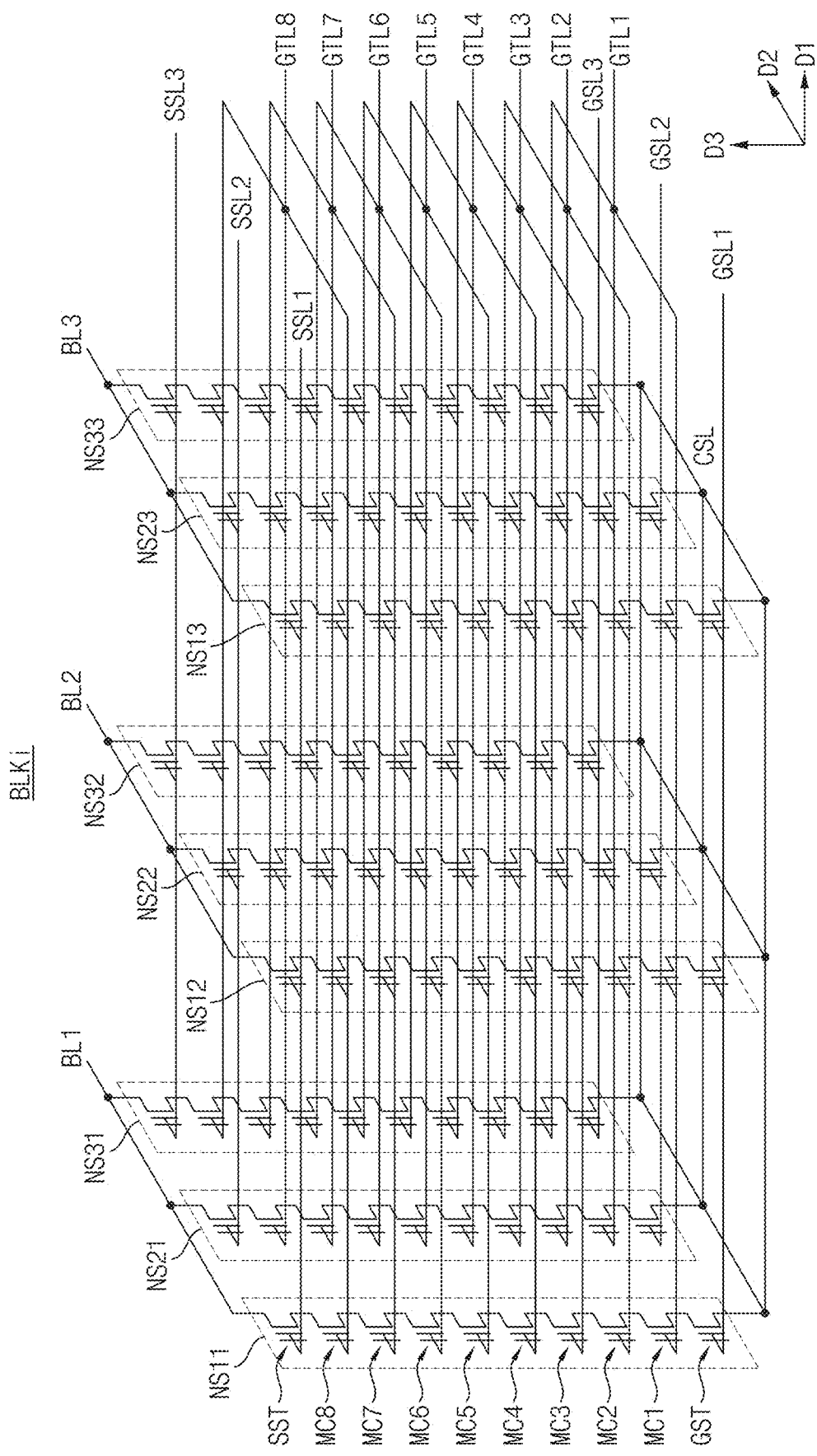
FIG. 18 is a circuit diagram illustrating an equivalent circuit of a memory block included in the memory cell array of FIG. 17, according to an example embodiment.

FIG. 17 is block diagram illustrating a memory cell array included in the nonvolatile memory device of FIG. 16, and FIG. 18 is a circuit diagram illustrating an equivalent circuit of a memory block included in the memory cell array of FIG. 17.

Referring to FIG. 17, the memory cell array 900 may include memory blocks BLK1 to BLKz. In some example embodiments, the memory blocks BLK1 to BLKz may be selected by the address decoder 830 of FIG. 16. For example, the address decoder 830 may select a particular memory block BLK corresponding to a block address among the memory blocks BLK1 to BLKz.

A memory block BLKi (i being an integer from 1 to z) of FIG. 18 may be formed on a substrate in a three-dimensional structure (or a vertical structure). For example, NAND strings or cell strings included in the memory block BLKi may be formed in a vertical direction D3 perpendicular to an upper surface of a substrate.

Referring to FIG. 18, the memory block BLKi may include NAND strings NS11 to NS33 coupled between bitlines BL1, BL2, and BL3 and a common source line CSL. Each of the NAND strings NS11 to NS33 may include a string selection transistor SST, a memory cells MC1 to MC8, and a ground selection transistor GST. In FIG. 18, each of the NAND strings NS11 to NS33 is illustrated to include eight memory cells MC1 to MC8. However, example embodiments are not limited thereto, and each of the NAND strings NS11 to NS33 may include various numbers of memory cells.

Each string selection transistor SST may be connected to a corresponding string selection line (one of SSL1 to SSL3). The memory cells MC1 to MC8 may be connected to corresponding gate lines GTL1 to GTL8, respectively. The gate lines GTL1 to GTL8 may be wordlines, and some of the gate lines GTL1 to GTL8 may be dummy wordlines. Each ground selection transistor GST may be connected to a corresponding ground selection line (one of GSL1 to GSL3). Each string selection transistor SST may be connected to a corresponding bitline (e.g., one of BL1, BL2, and BL3), and each ground selection transistor GST may be connected to the common source line CSL.

Wordlines (e.g., WL1) having the same or similar height may be commonly connected, and the ground selection lines GSL1 to GSL3 and the string selection lines SSL1 to SSL3 may be separated.

A storage device including the non-volatile memory device 800 as described with reference to FIGS. 16, 17 and 18 may be included in the monitored device 21, 22, and 23. If an uncontrollable error occurs in the operating system of the monitored device due to the operation of such a storage device, log data may be secured in real time according to example embodiments. Debugging may be performed based on the log data with respect to the storage device and the monitored device including the storage device.

Figure 19:
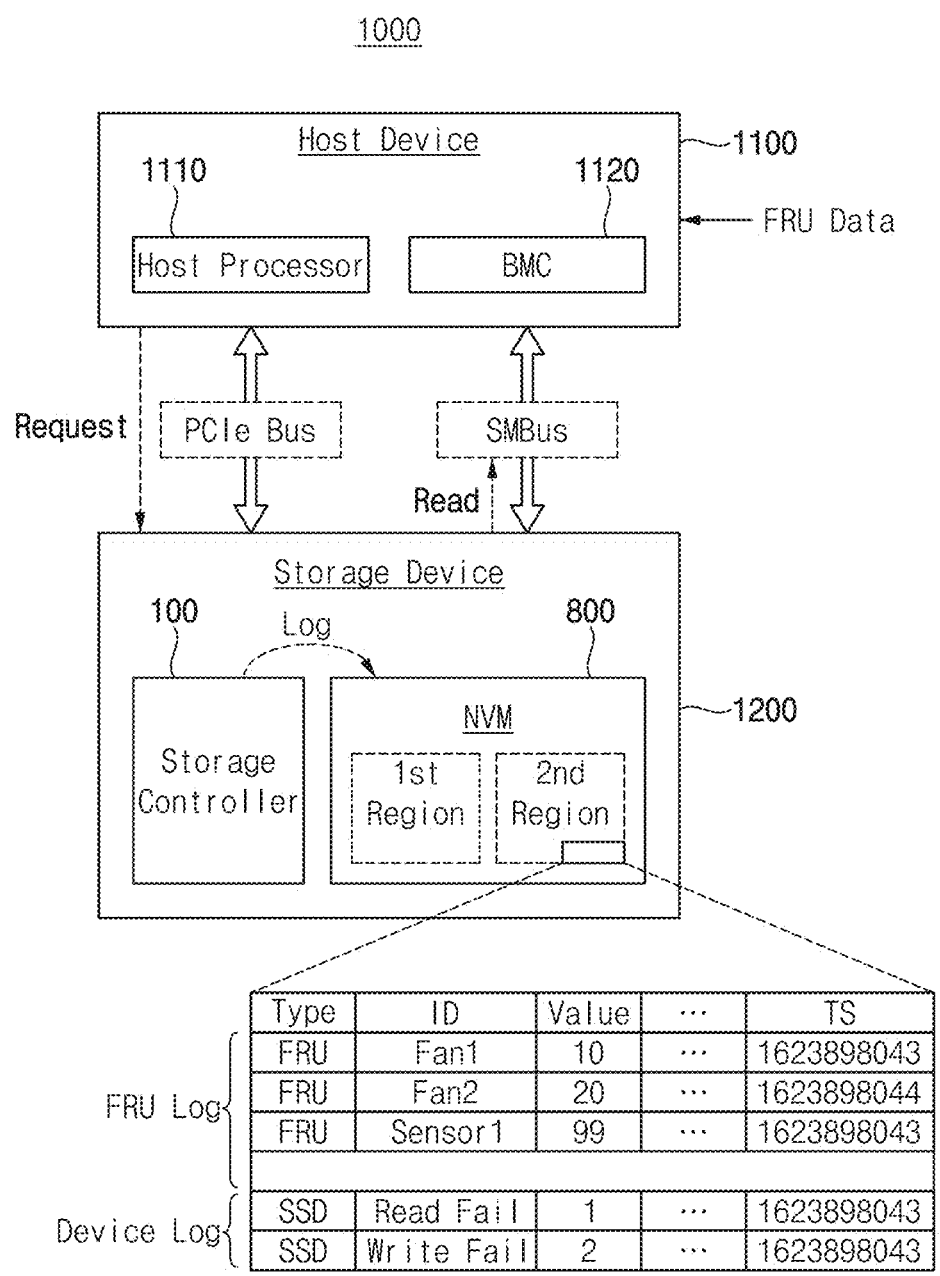
FIG. 19 is a diagram illustrating an example operation of the monitored device of FIG. 14, according to an example embodiment.

FIG. 19 is a diagram illustrating an example operation of a monitored device of FIG. 14, according to example embodiments.

The BMC 1120 of the host device 1100 may obtain the FRU data from the FRUs. For example, the BMC 1120 may include a fan that dissipates heat of the host device 1100, a temperature sensor that measures the internal temperature of the host device 1100, a power supply device that supplies power to the host device 1100, etc. The FRU data may include information about the vendor, type, and status (specific value) of the FRU device. For example, if the FRU is a fan, the FRU data obtained from the fan may include the manufacturer of the fan, the value indicating that the FRU is a fan, the speed (RPM) of the fan, etc.

The BMC 1120 may perform processing to add information about the occurrence time (i.e., timestamp) to the acquired FRU data. The BMC 1120 may transmit the processed FRU data to the host processor 1110 through a bus (e.g., PCIe bus) inside the host device 1100. Alternatively or additionally, The BMC 1120 may transmit the processed FRU data to the SMBus connected to storage device 1200. Alternatively or additionally, the BMC 1120 may store the FRU data in a separate memory device within host device 1100.

In an example embodiment, when a performance abnormality (or performance degradation) is detected in the storage device 1200, the host device 1100 may transmit a request (i.e., the log dump request) to the storage device 1200. Here, the request may be a request to store information related to an error of the storage device 1200 (i.e., device log) in a second area, which may be set to be distinct from a first area where user data is stored.

The storage device 1200 may read data from the SMBus connected to the host device 1100 in response to a request from the host device 1100. The BMC 1120 may flow the FRU data to the SMBus according to a predetermined SMBus protocol, and the storage device 1200 may obtain the FRU data from the SMBus connected to the host device 1100. For example, the FRU data may include type (a value indicating that it is a FRU), ID (a value indicating the type of FRU), a value that may confirm that there is a problem with the FRU, a time stamp TS (the occurrence time of the value), etc.

The storage device 1200 may generate a log dump command in response to a request from the host device 1100. The log dump command may be related to storing the FRU data obtained from the SMBus (i.e., FRU log) and the device log related to errors in the storage device 1200 in the second area of the nonvolatile memory device 800. For example, a device log may include a type (a value indicating that it is a storage device (e.g. SSD)), an ID (the number of the storage device), a value that identifies a problem with the storage device, and a timestamp TS, etc.

The nonvolatile memory device 800 may store the FRU data and device logs in the second area of the nonvolatile memory device 800 in response to the log dump command.

In some example embodiments, when it is confirmed that there is a problem with the FRU, the host device 1100 may transmit a request to the storage device 1200. Here, the request may be a request to store information (i.e., the FRU data) related to an error of the host device 1100 in the storage device 1200.

The BMC 1120 may confirm that there is a problem with the FRU based on whether the FRU data obtained from the FRU is within a reference range, below a reference value, or exceeds a reference value. The BMC 1120 may transmit a signal indicating that there is a problem with the FRU to the host processor 1110 according to the verification result. In some example embodiments, the host processor 1110 may determine whether the FRU data received from the BMC 1120 is within the reference range, below the reference value, or exceeds the reference value. Based on this determination, it may be confirmed that there is a problem with the FRU.

If it is confirmed that there is an error in the FRU data, the host processor 1110 may transmit a request to the storage device 1200. For example, the request from the host device 1100 includes storing the FRU data in the storage device 1200 in addition to requesting a log dump. Accordingly, the request from the host device 1100 may involve transferring the FRU data to the storage device 1200 through the PCIe bus.

The storage controller 100 may generate a log dump command in response to a request from the host device 1100. The log dump command may be a command for storing the FRU data and device logs received through the PCIe bus in the second area of the nonvolatile memory device 800. The nonvolatile memory device 800 may store the FRU data and/or device logs in the second area of the nonvolatile memory device 800 in response to the log dump command.

In some example embodiments, when it is confirmed that there is a problem with the FRU, the host device 1100 may transmit a request to the storage device 1200. Here, the request may be a request notifying that there is an error in the host device 1100. That is, the request is a simple notification that there is an error in the host device 1100, and the storage device 1200 may obtain the FRU data through a path different from the path through which the request is received (i.e., PCIe bus). For example, the storage device 1200 may obtain the FRU data by reading data from the SMBus connected to the host device 1100 in response to a request from the host device 1100.

The storage device 1200 may generate a log dump command in response to a request from the host device 1100. The log dump command may be related to storing the FRU data obtained from the SMBus (i.e., FRU log) and a device log related to errors in the storage device 1200 in the second area of the nonvolatile memory device 800.

The BMC 1120 may receive a log dump request LDREQ from a management device through a remote access port and perform a log dump operation as described above. The stored log data may be used for debugging to detect the cause of errors in the future. In some embodiments, the BMC 1120 may receive a reboot request RBREQ from the management device through the remote access port and control the power of the monitored device 1000 to initiate rebooting.

Figure 20:
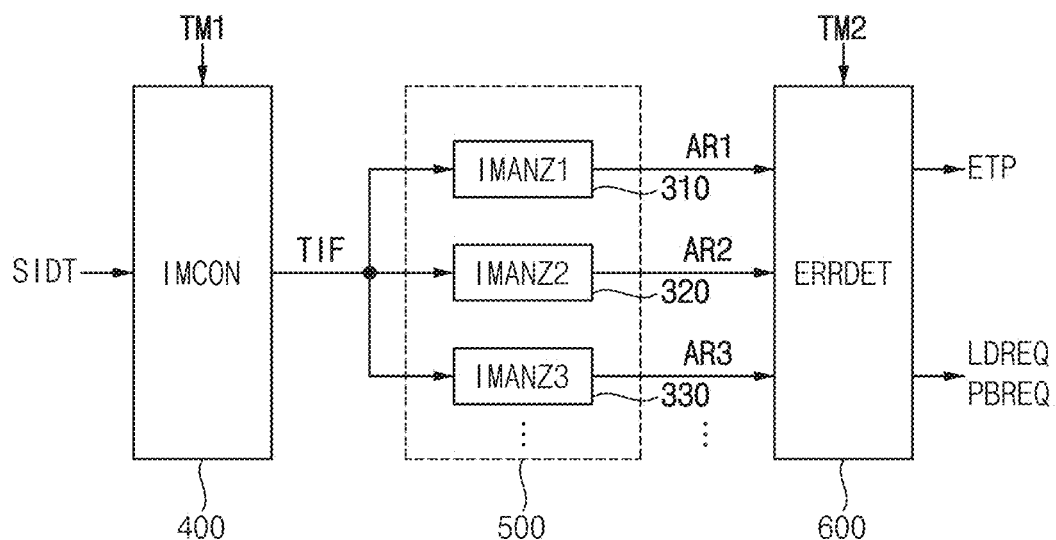
FIG. 20 is a block diagram illustrating an example of an error management module included in a management device of an electronic system according to example embodiments.

FIG. 20 is a block diagram illustrating an example of an error management module included in a management device of an electronic system according to example embodiments.

Referring to FIG. 20, the error management module EMM 300 may include an image converter (IMCON) 400, a plurality of image analyzers 500, and an error determination device (ERRDET) 600.

As described above, the error management module 300 determines whether an uncontrollable error has occurred in the operating system of the monitored device and the type of the uncontrollable error, and transfers requests LDREQ and RBREQ indicating a follow-up action corresponding to the type of the uncontrollable error to the monitored device.

The image converter 400 may generate target image frames TIF to be analyzed based on the screen image data SIDT. The image converter 400 may periodically generate target image frames TIF according to a constant sampling period determined based on a first timing control signal TM1.

The plurality of image analyzers 500 may perform analysis on target image frames TIF using different image analysis models and generate a plurality of analysis results AR1, AR2 and AR3, respectively. The image analysis models may be determined in various ways according to the error determination factors described above. FIG. 20 shows, as an example, three image analyzers, that is, a first image analyzer (IMANZ1) 310, a second image analyzer (IMANZ2) 320, and a third image analyzer (IMANZ3) 330, but example embodiments are not limited thereto. Depending on embodiments, the number of image analyzers may be determined in various ways.

The first image analyzer 310 may generate a first analysis result AR1 by performing analysis on the target image frames TIF using a first image analysis model. The second image analyzer 320 may generate a second analysis result AR2 by performing analysis on the target image frames TIF using a second image analysis model. The third image analyzer 330 may generate a third analysis result AR3 by performing analysis on target image frames TIF using a third image analysis model.

The plurality of image analyzers 500 may each perform independent analysis scheduling regardless of the analysis results of other image analyzers, and may be selectively enabled according to the analysis results of other image analyzers.

The error determination device 600 may determine whether an error has occurred and the error type ETP of the occurred error based on the plurality of analysis results AR1, AR2 and AR3. The error determination device 600 may transmit requests LDREQ and RBREQ indicating the follow-up actions corresponding to the determined error type ETP to the monitored device. The error determination unit 600 may operate based on a second timing control signal TM2.

Figure 21:
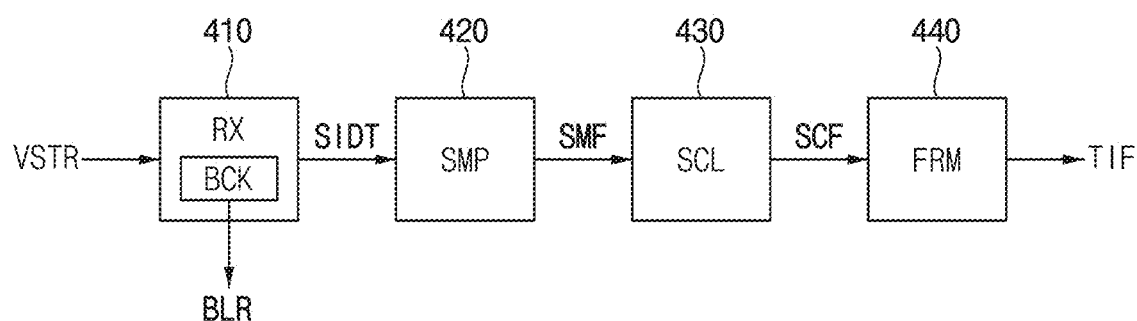
FIG. 21 is a block diagram illustrating an example of an image converter included in the error management module of FIG. 20.

FIG. 21 is a block diagram illustrating an example of an image converter included in the error management module of FIG. 20 according to example embodiments.

Referring to FIG. 21, the image converter 400 may include a receiver (RX) 410, a sampler (SMP) 420, a scaler (SCL) 430, and a format converter (FRM) 440.

The receiver 410 may receive a video stream VSTR and obtain screen image data SIDT included in the video stream VSTR. The video stream VSTR may include screen image data SIDT at regular intervals.

The sampler 420 may periodically sample the screen image data SIDT according to a certain sampling period and output sampled image frames SMF.

The scaler 430 may generate scaled image frames SCF by adjusting the size of the sampled image frames SMF. The scaler 430 may adjust the size of the frame to match the input size of the plurality of image analyzers 500 described above. For example, when the resolutions required for image analysis of each image analysis model in the plurality of image analyzers 500 are 1280×720, 640×480, and 640×640, respectively, and the input sampled image frames SMF are 1920×1080, a scale transformation that matches the input requirements of each image analysis model may be performed through pixel subsampling, linear interpolation, etc.

The format converter 440 may convert the format of scaled image frames SCF to generate the target image frames TIF that are to be analyzed. The format converter 440 may convert the format of the scaled image frames SCF into a format required by each image analysis model of the plurality of image analyzers 500.

In some example embodiments, the image converter 400 may further include an image quality checker BCK that detects the degree of blurriness of the screen image data SIDT and provides a blurriness value BLR indicating the degree of blur. The blurriness value BLR may be provided to the error determination device 600 of FIG. 20, and the error determination device 600 may determine whether to perform an error detection operation by referring to the blur value BLR.

Figure 22:
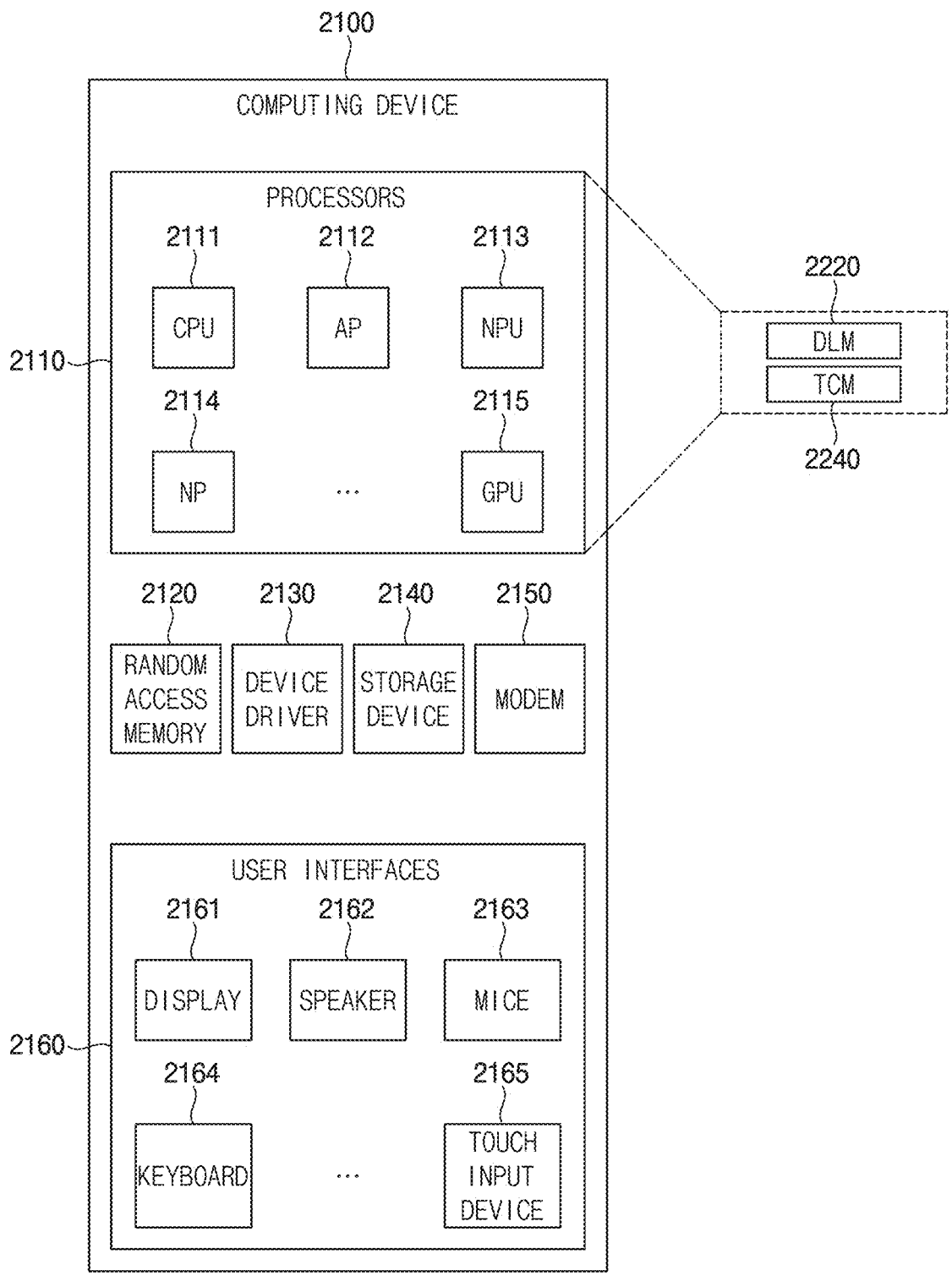
FIG. 22 is a block diagram illustrating a computing device according to example embodiments.

FIG. 22 is a block diagram illustrating a computing device according to example embodiments. The management device of the electronic system according to example embodiments may be implemented as a computing device of FIG. 22, but example embodiments are not limited thereto.

Referring to FIG. 22, a computing device 2100 may include processors 2110, a random access memory 2120, a device driver 2130, a storage device 2140, a modem 2150, and a user interfaces 2160.

At least one of the processors 2110 may execute a deep learning model (DLM) 2220 and a training control module (TCM) 2240 that controls training of the deep learning model 2200. The training control module 2240 may train the deep learning model 2220 as will be described below with reference to FIG. 26.

In some example embodiments, the deep learning model 2220 and the training control module 2240 may be implemented in the form of instructions (or program codes) executed by at least one of the processors 2110. The deep learning model 2220 and the training control module 2240 may be stored in a computer-readable recording medium. At least one processor may load instructions (or program codes) of the deep learning model 2220 and the training control module 2240 into the random access memory 2120.

In some example embodiments, at least one processor may be manufactured to implement deep learning model 2220 and training control module 2240. In some example embodiments, at least one processor may be manufactured to implement various machine learning modules or deep learning models. At least one processor may implement the deep learning model 2220 and the training control module 2240 by receiving information corresponding to the deep learning model 2220 and the training control module 2240.

The processors 2110 may include at least one central processing unit (CPU) 2111, an application processor (AP), etc. The processors 2110 may also include at least one special-purpose processor, such as a neural processing unit (NPU) 2113, a neuromorphic processor (NP) 2114, a graphics processing unit (GPU) 2115, etc. The processors 2110 may include two or more processors of the same type.

The random access memory 2120 is used as an operating memory of the processors 2110 and may be used as a main memory or system memory of the computing device 2100. The random access memory 2120 may include volatile memory, such as dynamic random access memory or static random access memory, or non-volatile memory, such as phase change random access memory, ferroelectric random access memory, magnetic random access memory, or resistive random access memory.

The device driver 2130 may control peripheral devices such as a storage device 2140, a modem 2150, and user interfaces 2160 according to requests from the processors 2110. The storage device 2140 may include a fixed storage device such as a hard disk drive, a solid state drive, or a removable storage device such as an external hard disk drive, an external solid state drive, or a removable memory card.

The modem 2150 may provide remote communication with external devices. The modem 2150 may perform wireless or wired communication with an external device. The modem 2150 may communicate with an external device through at least one of various communication forms such as Ethernet, Wi-Fi, LTE, and 5G mobile communication.

The user interfaces 2160 may receive information from, and provide information to, the user. The user interfaces 2160 may include at least one user output interface such as a display 2161, a speaker 2162, etc., and at least one user input interface such as a mouse (mice) 2163, a keyboard 2164, a touch input device 2165, etc.

Instructions (or program codes) of the deep learning model 2220 and the training control module 2240 may be received through the modem 2150 and stored in the storage device 2140. The instructions (or program codes) of the deep learning model 2220 and the training control module 2240 may be stored in a removable storage device that is coupled to computing device 2100. The instructions (or program codes) of the deep learning model 2220 and the training control module 2240 may be loaded from the storage device 2140 to the random access memory 2120 and then executed.

Computer program instructions, deep learning models DLMs, and training control modules TCMs may be stored on transitory computer-readable media or non-transitory computer-readable media. In at least some embodiments, the result values generated by the processor or the values of the arithmetic processing performed by the processor may be stored in a transitory computer-readable medium or a non-transitory computer-readable medium. In at least some embodiments, intermediate values generated during deep learning may be stored in a transitory computer-readable medium or a non-transitory computer-readable medium. However, the example embodiments are not limited thereto.

Figure 23:
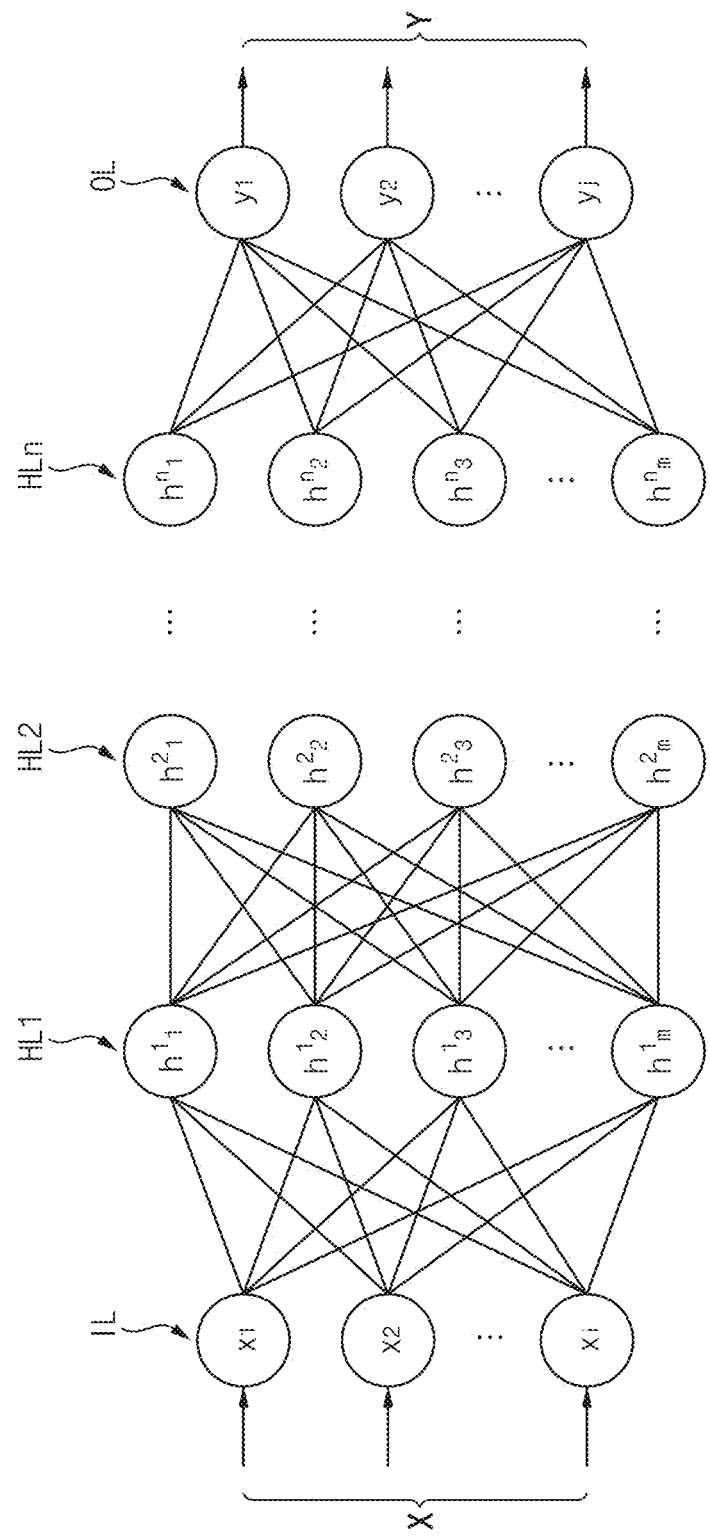
FIGS. 23 and 24 are diagrams for describing examples of a deep learning neural network structure that is generated by a machine learning device according to example embodiments.
Figure 24:
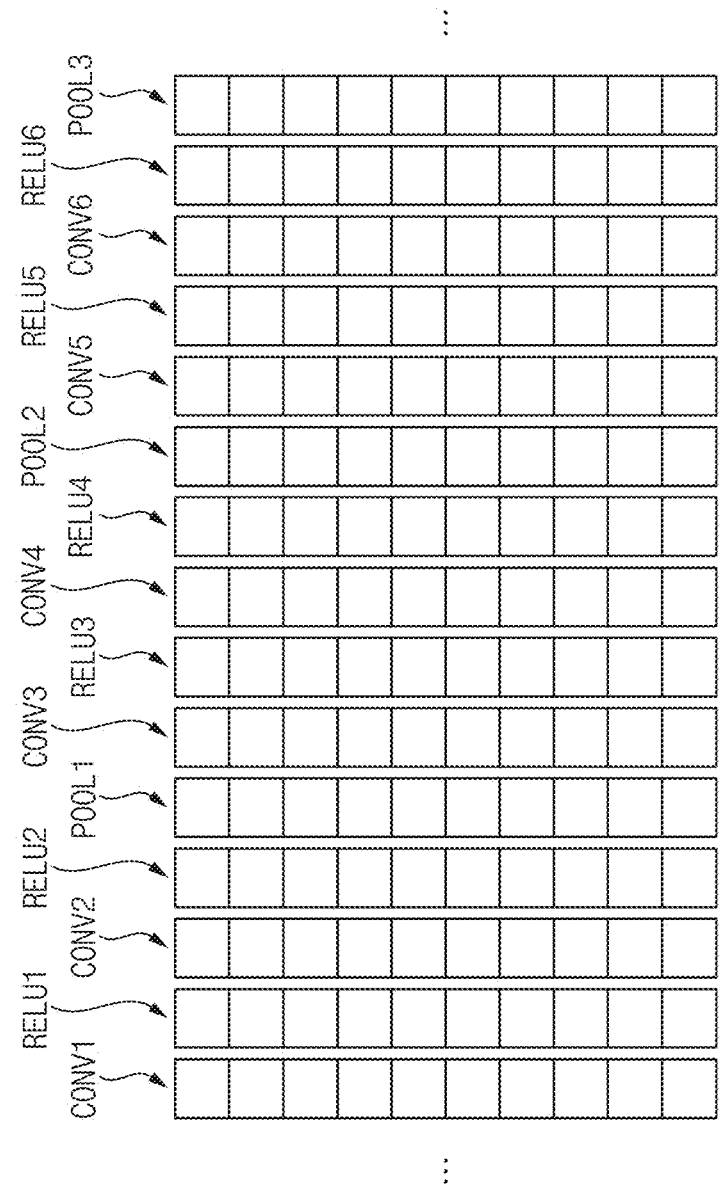

FIGS. 23 and 24 are diagrams for describing examples of a deep learning neural network structure that is generated by a machine learning device according to example embodiments.

Referring to FIG. 23, a neural network may include an input layer IL, a plurality of hidden layers HL1, HL2, . . . , HLn and an output layer OL.

The input layer IL may include i input nodes x1, x2, . . . , xi, where i is a natural number. Input data (e.g., vector input data) X whose length is i may be input to the input nodes x1, x2, . . . , xi such that each element of the input data X is input to a respective one of the input nodes x1, x2, . . . , xi.

The plurality of hidden layers HL1, HL2, . . . , HLn may include n hidden layers, where n is a natural number, and may include a plurality of hidden nodes $h^1_1$, $h^1_2$, $h^1_3$, . . . , $h^1_m$, $h^2_1$, $h^2_2$, $h^2_3$, . . . , $h^2_m$, $h''_1$, $h''_2$, $h''_3$, . . . , $h''_m$. For example, the hidden layer HL1 may include m hidden nodes $h^1_1$, $h^1_2$, $h^1_3$, . . . , $h^1_m$, the hidden layer HL2 may include m hidden nodes $h^2_1$, $h^2_2$, $h^2_3$, . . . , $h^2_m$, and the hidden layer HLn may include m hidden nodes $h''_1$, $h''_2$, $h''_3$, . . . , $h''_m$, where m is a natural number.

The output layer OL may include j output nodes y1, y2, . . . , yj, providing output data Y where j is a natural number. The output layer OL may output the output data Y associated with the input data X.

A structure of the neural network illustrated in FIG. 23 may be represented by information on branches (and/or connections) between nodes illustrated as lines, and a weighted value assigned to each branch. Nodes within one layer may not be connected to one another, but nodes of different layers may be fully (and/or partially) connected to one another.

Each node (e.g., the node $h^1_1$) may receive an output of a previous node (e.g., the node $x_1$), may perform a computing operation, computation and/or calculation on the received output, and may output a result of the computing operation, computation, or calculation as an output to a next node (e.g., the node $h^2_1$). Each node may calculate a value to be output by applying the input to a specific function, e.g., a nonlinear function.

In some example embodiments, the structure of the neural network may be set in advance, and the weighted values for the connections between the nodes are set appropriately using data having an already known answer of which class the data belongs to. The data with the already known answer may be referred to as "training data," and a process of determining the weighted value may be referred to as "training." The neural network "learns" during the training process. A group of an independently trainable structure and the weighted value is referred to as a "model," and a process of predicting, by the model with the determined weighted value, which class the input data belongs to, and then outputting the predicted value, is referred to as a "testing" process.

The neural network illustrated in FIG. 23 may not be suitable for handling input image data (or input sound data) because each node (e.g., the node $h^1_1$) is connected to all nodes of a previous layer (e.g., the nodes x1, x2, . . . , xi included in the layer IL) and then the number of weighted values drastically increases as the size of the input image data increases. Thus, a convolutional neural network ("CNN"), which is implemented by combining the filtering technique with the neural network, has been researched such that two-dimensional image (e.g., the input image data) is efficiently trained by the convolutional neural network.

Referring to FIG. 24, a convolutional neural network (CNN) may include a plurality of layers CONV1, RELU1, CONV2, RELU2, POOL1, CONV3, RELU3, CONV4, RELU4, POOL2, CONV5, RELU5, CONV6, RELU6, POOL3, and FC.

Unlike the neural network in FIG. 23, each layer of the convolutional neural network may have three dimensions of width, height, and depth, and thus data that is input to each layer may be volume data having three dimensions of width, height, and depth.

Each of convolutional layers CONV1, CONV2, CONV3, CONV4, CONV5, and CONV6 may perform a convolutional operation on input volume data. For example, in an image processing, the convolutional operation represents an operation in which image data is processed based on a mask with weighted values and an output value is obtained by multiplying input values by the weighted values and adding up the total multiplied values. The mask may be referred to as a filter, window, and/or kernel.

In further detail, parameters of each convolutional layer may comprise (and/or include) a set of learnable filters. Every filter may be spatially small (e.g., along width and height), but may extend through the full depth of an input volume. For example, during the forward pass, each filter may be slid (e.g., convolved) across the width and height of the input volume, and dot products may be computed between the entries of the filter and the input at any position. As the filter is slid over the width and height of the input volume, a two-dimensional activation map that gives the responses of that filter at every spatial position may be generated. As a result, an output volume may be generated by stacking these activation maps along the depth dimension. For example, if input volume data having a size of 32×32×3 passes through the convolutional layer CONV1 having four filters with zero-padding, output volume data of the convolutional layer CONV1 may have a size of 32×32×12 (e.g., a depth of volume data increases).

Each of the rectifying linear unit (RELU) layers RELU1, RELU2, RELU3, RELU4, RELU5, and RELU6 may perform a rectified linear unit operation that corresponds to an activation function defined by, e.g., a function f (x)=max(0, x) (e.g., an output is zero for all negative input x). For example, if input volume data having a size of 32×32×12 passes through the RELU layer RELU1 to perform the rectified linear unit operation, output volume data of the RELU layer RELU1 may have a size of 32×32×12 (e.g., a size of volume data is maintained).

Each of pooling layers POOL1, POOL2, and POOL3 may perform a down-sampling operation on input volume data along spatial dimensions of width and height. For example, four input values arranged in a 2×2 matrix formation may be converted into one output value based on a 2×2 filter. For example, a maximum value of four input values arranged in a 2×2 matrix formation may be selected based on 2×2 maximum pooling, or an average value of four input values arranged in a 2×2 matrix formation may be obtained based on 2×2 average pooling. For example, if input volume data having a size of 32×32×12 passes through the pooling layer POOL1 having a 2×2 filter, output volume data of the pooling layer POOL1 may have a size of 16×16×12 (e.g., width and height of volume data decreases, and a depth of volume data is maintained).

Typically, one convolutional layer (e.g., CONV1) and one RELU layer (e.g., RELU1) may form a pair of CONV/RELU layers in the convolutional neural network, pairs of the CONV/RELU layers may be repeatedly arranged in the convolutional neural network, and the pooling layer may be periodically inserted in the convolutional neural network, thereby reducing characteristics of the input data X. The type and number of layers including in the convolution neural network may be changed variously.

Example embodiments of the deep learning model are not limited to a specific neural network. The deep learning model may include, for example, at least one of PNN (Perceptron Neural Network), CNN (Convolution Neural Network), R-CNN (Region with Convolution Neural Network), RPN (Region Proposal Network), RNN (Recurrent Neural Network), S-DNN (Stacking-based deep Neural Network), S-SDNN (State-Space Dynamic Neural Network), Deconvolution Network, DBN (Deep Belief Network), RBM (Restricted Boltzmann Machine), Fully Convolutional Network, LSTM (Long Short-Term Memory) Network, Classification Network, BNN (Bayesian Neural Network), and/or the like.

Figure 25:
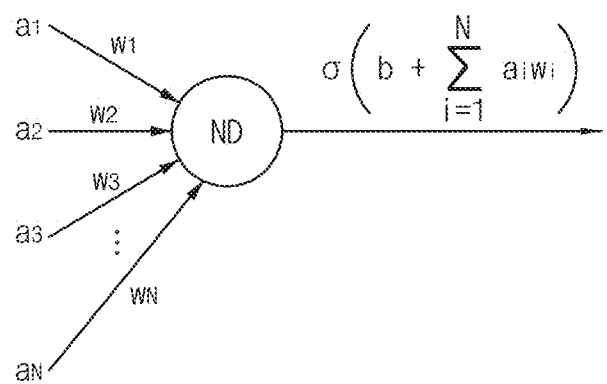
FIG. 25 is a diagram illustrating an example of a node included in a neural network, according to example embodiments.

FIG. 25 is a diagram illustrating an example of a node included in a neural network.

FIG. 25 illustrates an example node operation performed by a node ND in a neural network. When N inputs a1~an are provided to the node ND, the node ND may multiply the n inputs a1~an and corresponding n weights w1~wn, respectively, may sum n values obtained by the multiplication, may add an offset "b" to a summed value, and may generate one output value by applying a value to which the offset "b" is added to a specific function "σ". The learning operation may be performed based on the training data to update all nodes in the neural network.

In cases of image analysis based on deep learning, a sufficient amount of training data and/or learning data may be utilized in (and/or required for) training of a deep learning model (and/or deep learning module). For example, the training data of various kinds may be utilized (and/or required) to prevent over-fitting during training and enhance performance of the deep learning model.

Figure 26:
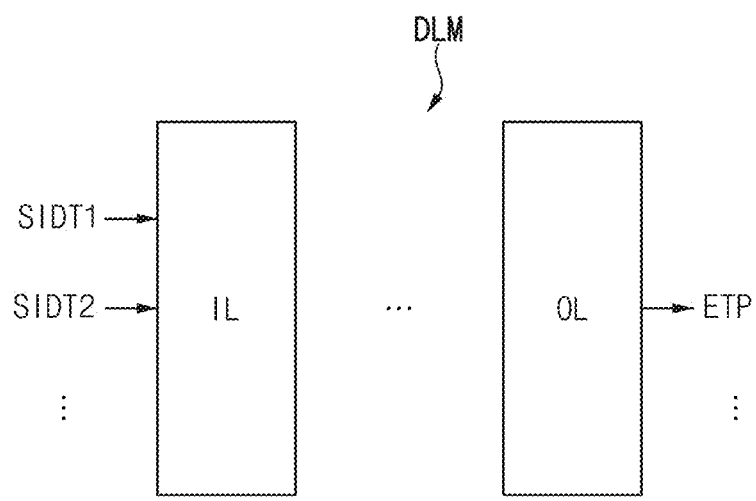
FIG. 26 is a diagram illustrating an example of a deep learning model to perform error determination in a method of managing errors of an electronic system according to example embodiments.

FIG. 26 is a diagram illustrating an embodiment of a deep learning model to perform error determination in a method of managing errors of an electronic system according to example embodiments. In FIG. 26, for convenience of illustration, the specific configuration of the deep learning model is omitted, and only the input layer IL that receives input data and the output layer OL that provides output data are shown.

Referring to FIG. 26, a deep learning model DLM that may replace at least a portion of the table-type reference information RFI as described above with reference to FIG. 3 and the error management module 300 of FIG. 20 may be trained and generated.

In this case, the input data of the deep learning model DLM includes one or more temporally continuous screen image data SIDT1 and SIDT2, and the output data of the deep learning model DLM includes the estimated error type ETP. Using the deep learning model DLM learned in this way, it is possible to determine whether an uncontrollable error has occurred in the operating system of the monitored device and determine the type of the uncontrollable error.

Figure 27:
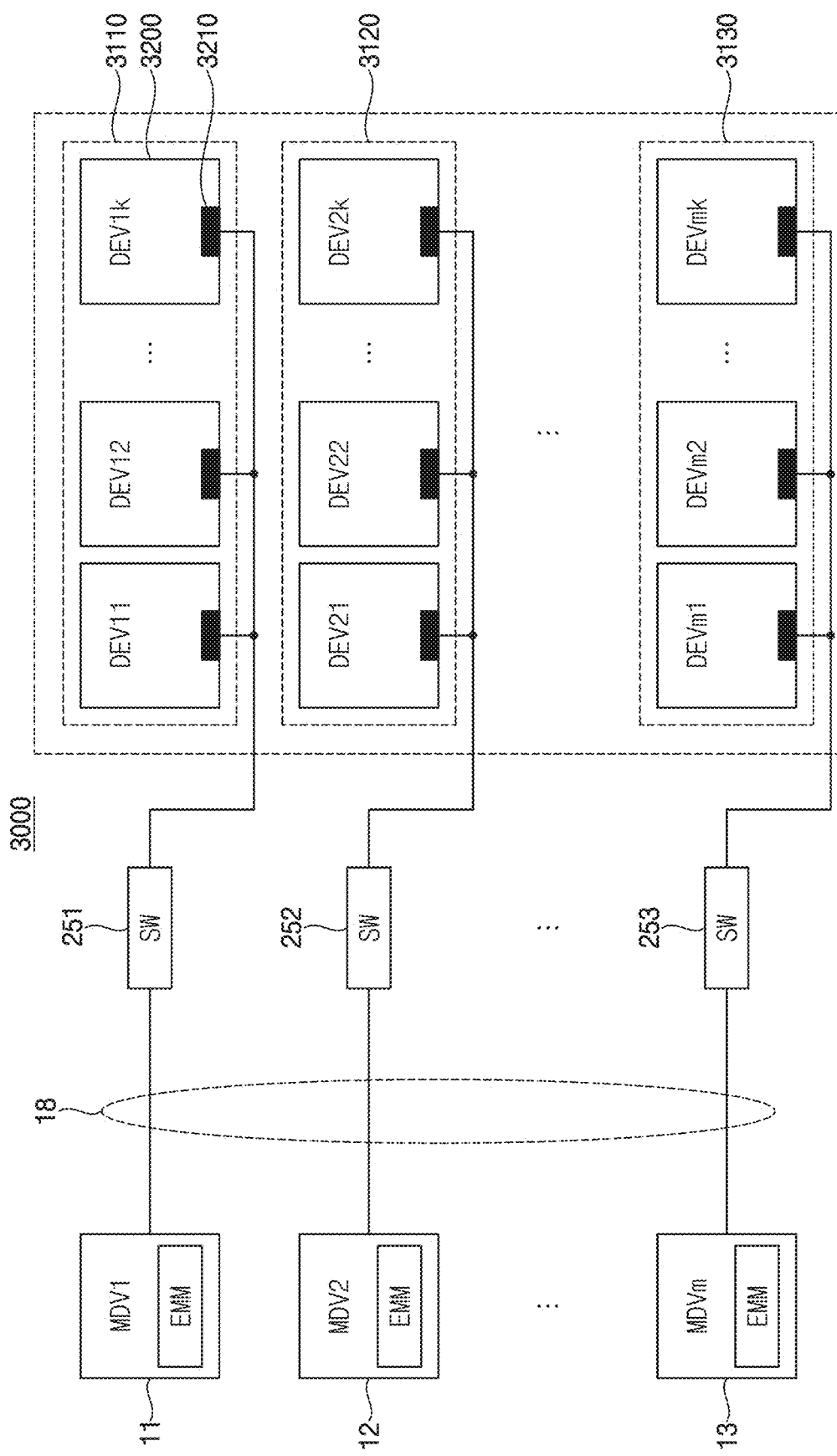
FIGS. 27 and 28 are block diagrams illustrating an electronic system according to example embodiments.
Figure 28:
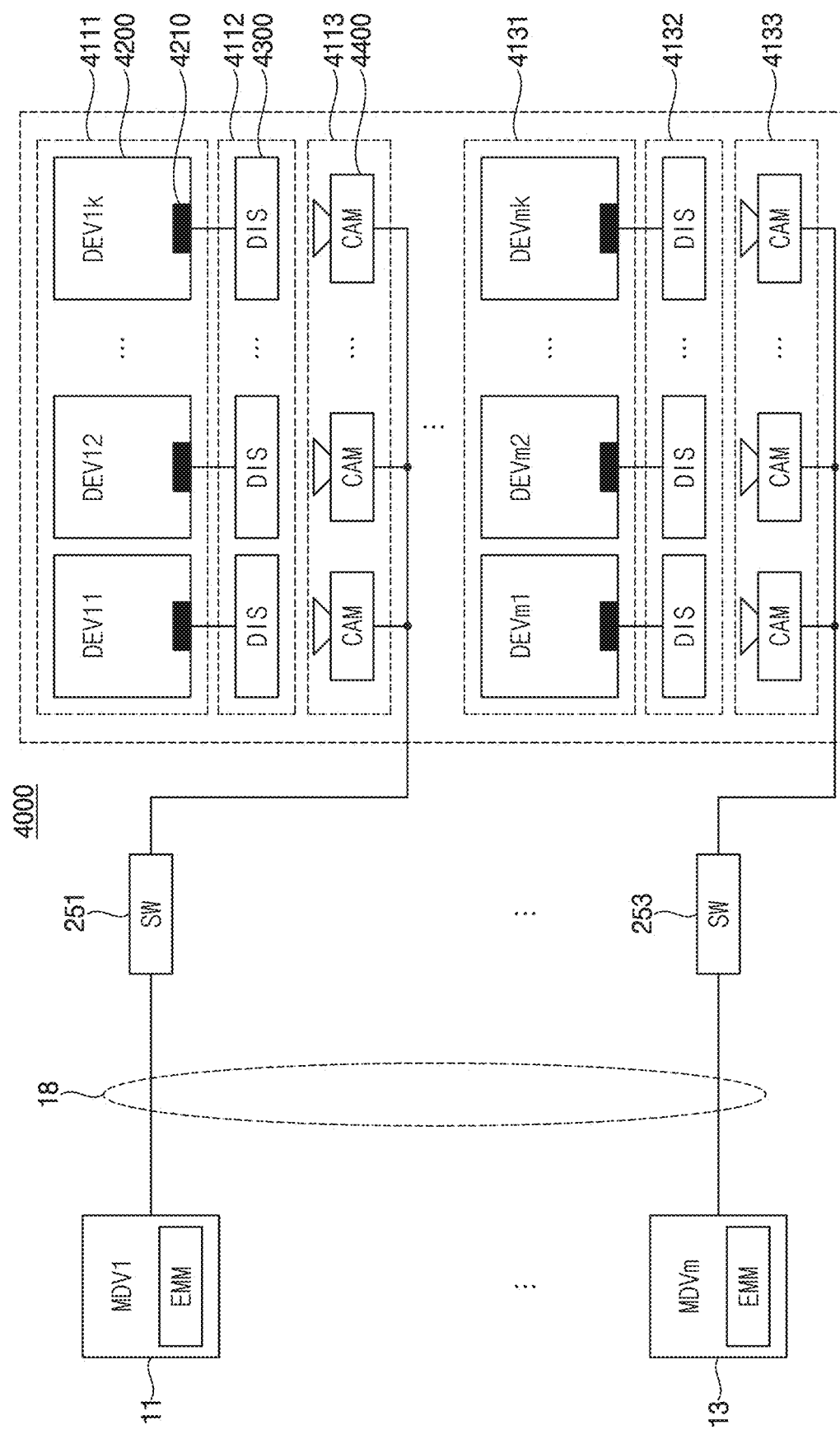

FIGS. 27 and 28 are block diagrams illustrating an electronic system according to example embodiments.

Referring to FIG. 27, an electronic system 3000 includes a plurality of management devices (MDV1, MDV2 and MDVm) 11, 12 and 13, a plurality of switches (SW) 251, 252 and 253, and a plurality of monitored devices (DEV11~DEVmk) 3200. In some example embodiments, the plurality of switches 251, 252, and 253 may be Keyboard Video Mouse (KVM) switches connected between the display output ports 3210 of the plurality of monitored devices 3200 and the management devices 11, 12, and 13. The plurality of switches 251, 252, and 253 may be connected to a plurality of management devices 11, 12, and 13 through a communication network 18. As shown in FIG. 27, in some example embodiments, the first group of monitored devices 3110 may be connected to the management device 11 through the switch 251, and the second group of monitored devices 3120 may be connected to the switch 252, and the m-th group of monitored devices 3130 may be connected to the management device 13 through the switch 253.

Referring to FIG. 28, an electronic system 4000 includes a plurality of management devices (MDV1 and MDVm) 11 and 13, a plurality of switches (SW) 251 and 253, and a plurality of monitored target devices (DEV11 to DEVmk) 4200, a plurality of display devices (DIS) 4300, and a plurality of camera modules (CAM) 4400. The plurality of display devices 4300 may display respective display images on respective screen of the display devices 4300, and the plurality of camera modules 4400 may capture the screens of the plurality of display devices 4300, respectively. In this case, the management devices 11 and 13 may periodically receive the above-described screen image data from the plurality of camera modules 4400 through the switches 251 and 253. The plurality of switches 251 and 253 may be connected to the plurality of management devices 11 and 13 through a communication network 18. As shown in FIG. 28, the camera modules 4113 that capture the screens of the display devices 4112 of the first group of monitoring target devices 4111 are connected to the management device 11 through the switch 251. The camera modules 4133 that are connected and capture the screens of the display devices 4132 of the m-th group of monitored devices 4131 may be connected to the management device 13 through the switch 253.

As shown in FIGS. 27 and 28, a KVM may be connected, for example, to all server systems deployed in a lab to periodically extract screen output information from a remote location, and the uncontrollable errors in the operating system may be identified and the follow-up actions may be performed without an engineer's lab visit, through the image analysis of the screen output information and the additional system information according to example embodiments as described above.

Example embodiments may be applied to a data center server system environment. The data center determines the communication states of each server and detects server abnormalities. The screen information may be extracted by accessing the IP-KVM connected to the server where an error was detected. Based on additional information and image processing information, the presence and type of uncontrollable errors defined in advance may be determined. In the event of an error, predefined follow-up actions may be performed, such as a memory dump, a system reboot, status quo, etc.

As shown in FIG. 28, in a laptop-based environment where screen information cannot be extracted through KVM, one monitoring system may be placed per IP web camera to periodically extract screen output information from a remote location.

Figure 29:
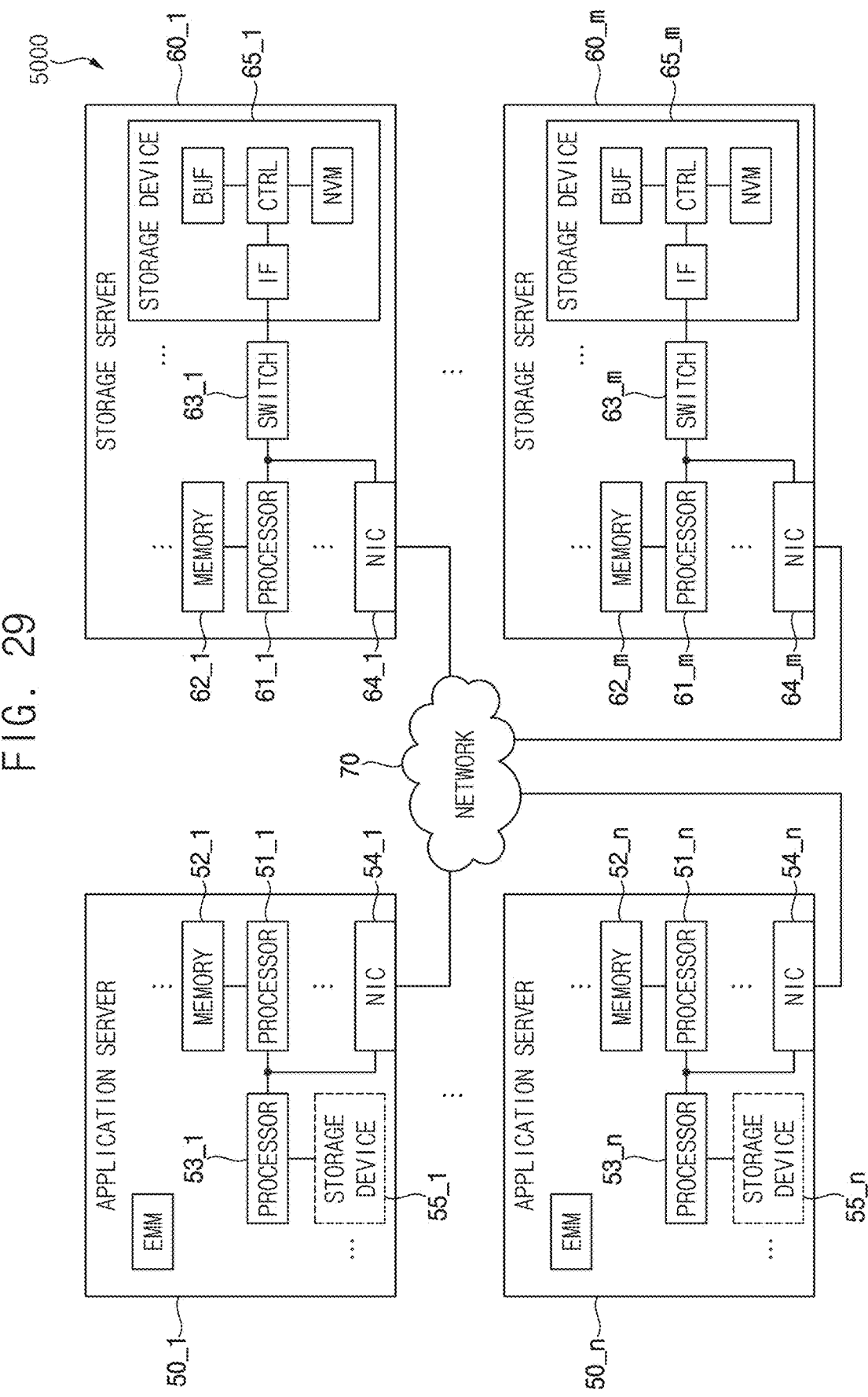
FIG. 29 is a block diagram illustrating a data center including an electronic system according to example embodiments.

FIG. 29 is a block diagram illustrating a data center including an electronic system according to example embodiments.

In some example embodiments, the system described above with reference to the drawings may serve as an application server and/or a storage server and be included in a data center 5000. The error management according to example embodiments may be applied to each of the application server and/or the storage server.

Referring to FIG. 29, the data center 5000 may collect various pieces of data and provide services and be also referred to as a data storage center. For example, the data center 5000 may be a system configured to operate a search engine and a database or a computing system used by companies, such as banks, or government agencies. As shown in FIG. 29, the data center 5000 may include application servers $50\_1$ to $50\_n$ and storage servers $60\_1$ to $60\_m$ (where, each of m and n is an integer more than 1). The number n of application servers $50\_1$ to $50\_n$ and the number m of storage servers $60\_1$ to $60\_m$ may be variously selected according to embodiments. In some example embodiments, the number n of application servers $50\_1$ to $50\_n$ may be different from the number m of storage servers $60\_1$ to $60\_m$.

The application servers $50\_1$ to $50\_n$ may include any one or any combination of processors $51\_1$ to $51\_n$, memories $52\_1$ to $52\_n$, switches $53\_1$ to $53\_n$, NICs $54\_1$ to $54\_n$, and storage devices $55\_1$ to $55\_n$. The processors $51\_1$ to $51\_n$ may control all operations of the application servers $50\_1$ to $50\_n$, access the memories $52\_1$ to $52\_n$, and execute instructions and/or data loaded in the memories $52\_1$ to $52\_n$. Non-limiting examples of the memories $52\_1$ to $52\_n$ may include DDR SDRAM, a high-bandwidth memory (HBM), a hybrid memory cube (HMC), a dual in-line memory module (DIMM), a Optane DIMM, or a non-volatile DIMM (NVDIMM).

According to example embodiments, the numbers of processors and memories included in the application servers $50\_1$ to $50\_n$ may be variously selected according to embodiments. In some embodiments, the processors $51\_1$ to $51\_n$ and the memories $52\_1$ to $52\_n$ may provide processor-memory pairs. In some embodiments, the number of processors $51\_1$ to $51\_n$ may be different from the number of memories $52\_1$ to $52\_n$. The processors $51\_1$ to $51\_n$ may include a single core processor or a multi-core processor. In some embodiments, as illustrated with a dashed line in FIG. 29, the storage devices $55\_1$ to $55\_n$ may be omitted from the application servers 50_1 to 50_*n*. The number of storage devices 55_1 to 55_*n* included in the storage servers 50_1 to 50_*n* may be variously selected according to embodiments. The processors 51_1 to 51_*n*, the memories 52_1 to 52_*n*, the switches 53_1 to 53_*n*, the NICs 54_1 to 54_*n*, and/or the storage devices 55_1 to 55_*n* may communicate with each other through a link described above with reference to the drawings.

The storage servers 60_1 to 60_*m* may include any one or any combination of processors 61_1 to 61_*m*, memories 62_1 to 62_*m*, switches 63_1 to 63_*m*, NICs 64_1 to 64_*n*, and storage devices 65_1 to 65_*m*. The processors 61_1 to 61_*m* and the memories 62_1 to 62_*m* may operate similar to the processors 51_1 to 51_*n* and the memories 52_1 to 52_*n* of the application servers 50_1 to 50_*n* described above. The application servers 50_1 to 50_*n* may communicate with the storage servers 60_1 to 60_*m* through a network 70. In some embodiments, the network 70 may be implemented using a fiber channel (FC) or Ethernet. The FC may be a medium used for relatively high-speed data transfer. An optical switch that provides high performance and high availability may be used as the FC. The storage servers 60_1 to 60_*m* may be provided as file storages, block storages, or object storages according to an access method of the network 70.

In some example embodiments, the network 70 may be a storage-only network, such as a storage area network (SAN). For example, the SAN may be an FC-SAN, which may use an FC network and be implemented using an FC Protocol (FCP). In another case, the SAN may be an Internet protocol (IP)-SAN, which uses a transmission control protocol/Internet protocol (TCP/IP) network and is implemented according to an SCSI over TCP/IP or Internet SCSI (iSCSI) protocol. In some embodiments, the network 70 may be a general network, such as a TCP/IP network. For example, the network 70 may be implemented according to a protocol, such as FC over Ethernet (FCOE), network attached storage (NAS), non-volatile memory express (NVMe) over fabrics (NVMe-oF).

The application server 50_1 and the storage server 60_1 will mainly be described, but it may be noted that a description of the application server 50_1 may be also applied to another application server (e.g., 50_*n*), and a description of the storage server 60_1 may be also applied to another storage server (e.g., 60_*m*).

The application server 50_1 may store data, which is requested to be stored by a user or a client, in one of the storage servers 60_1 to 60_*m* through the network 70. In some example embodiments, the application server 50_1 may obtain data, which is requested to be read by the user or the client, from one of the storage servers 60_1 to 60_*m* through the network 70. For example, the application server 50_1 may be implemented as a web server or a database management system (DBMS).

The application server 50_1 may access the memory 52_*n* and/or the storage device 55_*n* included in another application server 50_*n*, through the network 70, and/or access the memories 62_1 to 62_*m* and/or the storage devices 65_1 to 65_*m* included in the storage servers 60_1 to 60_*m*, through the network 70. Accordingly, the application server 50_1 may perform various operations on data stored in the application servers 50_1 to 50_*n* and/or the storage servers 60_1 to 60_*m*. For example, the application server 50_1 may execute an instruction to migrate or copy data between the application servers 50_1 to 50_*n* and/or the storage servers 60_1 to 60_*m*. In this case, the data may be migrated from the storage devices 65_1 to 65_*m* of the storage servers 60_1 to 60_*m* to the memories 52_1 to 52_*n* of the application servers 50_1 to 50_*n* through the memories 62_1 to 62_*m* of the storage servers 60_1 to 60_*m* or directly. In some embodiments, the data migrated through the network 70 may be encrypted data for security or privacy.

In the storage server 60_1, an interface IF may provide physical connection between the processor 61_1 and a controller CTRL and physical connection between the NIC 64_1 and the controller CTRL. For example, the interface IF may be implemented using a direct attached storage (DAS) method in which the storage device 65_1 is directly connected to a dedicated cable. For example, the interface IF may be implemented using various interface methods, such as advanced technology attachment (ATA), serial ATA (SATA), external SATA (e-SATA), small computer small interface (SCSI), serial attached SCSI (SAS), PCI, PCIe, NVMe, IEEE 1394, a universal serial bus (USB), a secure digital (SD) card, a multi-media card (MMC), an embedded MMC (eMMC), a UFS, an embedded UFS (eUFS), and a compact flash (CF) card interface.

In the storage server 60_1, the switch 63_1 may selectively connect the processor 61_1 to the storage device 65_1 or selectively connect the NIC 64_1 to the storage device 65_1 based on the control of the processor 61_1.

In some example embodiments, the NIC 64_1 may include a network interface card (NIC) and a network adaptor. The NIC 54_1 may be connected to the network 70 through a wired interface, a wireless interface, a bluetooth interface, or an optical interface. The NIC 54_1 may include an internal memory, a digital signal processor (DSP), and a host bus interface and be connected to the processor 61_1 and/or the switch 63_1 through the host bus interface. In some embodiments, the NIC 64_1 may be integrated with any one or any combination of the processor 61_1, the switch 63_1, and the storage device 65_1.

In the application servers 50_1 to 50_*n* or the storage servers 60_1 to 60_*m*, the processors 51_1 to 51_*m* and 61_1 to 61_*n* may transmit commands to the storage devices 55_1 to 55_*n* and 65_1 to 65_*m* or the memories 52_1 to 52_*n* and 62_1 to 62_*m* and program or read data. In this case, the data may be data of which an error is corrected by an error correction code (ECC) engine. The data may be data processed with data bus inversion (DBI) or data masking (DM) and include cyclic redundancy Code (CRC) information. The data may be encrypted data for security or privacy.

In response to read commands received from the processors 51_1 to 51_*m* and 61_1 to 61_*n*, the storage devices 55_1 to 55_*n* and 65_1 to 65_*m* may transmit control signals and command/address signals to a non-volatile memory device (e.g., a NAND flash memory device) NVM. Accordingly, when data is read from the non-volatile memory device NVM, a read enable signal may be input as a data output control signal to output the data to a DQ bus. A data strobe signal may be generated using the read enable signal. The command and the address signal may be latched according to a rising edge or falling edge of a write enable signal.

The controller CTRL may control all operations of the storage device 65_1. In embodiments, the controller CTRL may include static RAM (SRAM). The controller CTRL may write data to the non-volatile memory device NVM in response to a write command or read data from the non-volatile memory device NVM in response to a read command. For example, the write command and/or the read command may be generated based on a request provided from a host (e.g., the processor 61_1 of the storage server 60_1, the processor 61_*m* of another storage server 60_*m*, or the processors 51_1 to 51_*n* of the application servers 50_1 to 50_n). A buffer BUF may temporarily store (or buffer) data to be written to the non-volatile memory device NVM or data read from the non-volatile memory device NVM. In some embodiments, the buffer BUF may include DRAM. The buffer BUF may store metadata. The metadata may refer to user data or data generated by the controller CTRL to manage the non-volatile memory device NVM. The storage device 65_1 may include a secure element (SE) for security or privacy.

The application servers 50_1 to 50_n may include an error management module EMM according to example embodiments. The error management module EMM may be used to monitor operating system errors on storage servers 60_1 to 60_m and automatically perform follow-up actions.

Those skilled in the art will understand that example embodiments may be implemented in the form of a system, a method, a product including computer-readable program code stored in a computer-readable medium, etc. The computer-readable program code may be provided to a processor of various computers or other data processing devices. The computer-readable medium may be a computer-readable signal medium or a computer-readable recording medium. The computer-readable recording medium may be any tangible medium capable of storing or containing a program in or connected to an instruction execution system, equipment, or device.

The example embodiments may be applied to any electronic devices and systems. For example, the example embodiments may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, a data center, etc.

The foregoing is illustrative of example embodiments and is not to be construed as limiting thereof. Although a few example embodiments have been described, those skilled in the art will readily appreciate that many modifications are possible in the example embodiments without materially departing from the scope of the appended claims.

What is claimed is:

1. An electronic system comprising: a monitored device configured to operate according to an operating system and generate a display image; and a management device connected to the monitored device through a communication network and configured to:
periodically receive, from the monitored device, screen image data corresponding to the display image;
determine whether an error that causes the operating system of the monitored device to become inoperable occurs in the operating system of the monitored device based on a network connection state with the monitored device;
based on determining that the error has occurred, compare image type factors of a plurality of error determination factors with the screen image data to generate a first comparison result and compare state type factors of the plurality of error determination factors with the network connection state to generate a second comparison result;
determine a type of the error according to the first comparison result and the second comparison result; and
transfer, to the monitored device, a request indicating an error correction procedure for the error, based on the type of the error.

2. The electronic system of claim 1, wherein the management device is configured to store a plurality of error types and determine whether the error correspond to one of the plurality of error types.

3. The electronic system of claim 2, wherein the management device is configured to store priorities of the plurality of error types, and sequentially determine whether the error corresponds to the plurality of error types based on the priorities.

4. The electronic system of claim 2, wherein the management device is configured to, when the error corresponds to the one of the plurality of error types, transfer at least one of a log dump request and a reboot request to the monitored device based on the type of the error,
wherein the log dump request instructs the monitored device to store log data inside the monitored device or to transfer the log data to the management device, and
wherein the reboot request instructs the monitored device to reboot.

5. The electronic system of claim 1, wherein the type of the error comprises one of a blue screen of death, startup freezing, a black screen and an operating system freezing.

6. The electronic system of claim 5, wherein the type of the error is determined sequentially according to an order of the blue screen of death, the startup freezing, the black screen and the operating system freezing.

7. The electronic system of claim 5, wherein the management device is configured to, when the type of the error corresponds to one of the blue screen of death, the startup freezing, the black screen and the operating system freezing, transfer a log dump request to the monitored device,
wherein the log dump request instructs the monitored device to store log data inside the monitored device or to transfer the log data to the management device.

8. The electronic system of claim 1, wherein the management device is configured to monitor the network connection state between the monitored device and the management device based on a communication protocol and determine that the error does not occur when communication is performed normally between the monitored device and the management device according to the communication protocol.

9. The electronic system of claim 1, wherein the management device is configured to monitor a power state of the monitored device and determine that the error does not occur when the monitored device is in a power-off state.

10. The electronic system of claim 1, wherein the management device is configured to periodically receive the screen image data through an output port of the monitored device.

11. The electronic system of claim 1, further comprising:
a keyboard video mouse (KVM) switch connected between the management device and a display output port of the monitored device,
wherein the management device is configured to periodically receive the screen image data through the KVM switch.

12. The electronic system of claim 1, wherein the monitored device comprises:
a display device configured to display the display image on a screen; and
a camera module configured to capture an image of the screen, wherein the management device is configured to periodically receive the screen image data from the camera module.

13. The electronic system of claim 1, wherein the image type factors of the plurality of error determination factors include a color of the display image, a quick response (QR) code included in the display image, a character string included in the display image, a marker included in the display image, and a difference of the display image over time, and the state type factors of the plurality of error determination factors include the network connection state between the monitored device and the management device and a power state of the monitored device.

14. The electronic system of claim 1, wherein the management device is configured to determine whether the error occurs and the type of the error using a deep learning model that takes the screen image data as input and outputs the type of the error.

15. An electronic system comprising:
a plurality of monitored devices, each configured to operate according to an operating system, the plurality of monitored devices being configured to generate a plurality of display images, respectively; and
a management device connected to the plurality of monitored devices through a communication network and configured to:
periodically receive, from the plurality of monitored devices, a plurality of screen image data corresponding to the plurality of display images;
determine whether an error that causes the operating system of one of the plurality of monitored devices to become inoperable occurs in the operating system of the one of the plurality of monitored devices based on a network connection state with the plurality of monitored devices;
based on determining that the error has occurred, compare image type factors of a plurality of error determination factors with the plurality of screen image data to generate a first comparison result and compare state type factors of the plurality of error determination factors with the network connection state to generate a second comparison result;
determine a type of the error according to the first comparison result and the second comparison result; and
transfer, to the one of the plurality of monitored devices, a request indicating an error correction procedure for the error, based on the type of the error.

16. The electronic system of claim 15, further comprising:
a keyboard video mouse (KVM) switch connected between the management device and display output ports of the plurality of monitored devices, wherein the management device is configured to periodically receive the plurality of screen image data from the KVM switch.

17. The electronic system of claim 15, wherein the plurality of monitored devices comprise:
a plurality of display devices configured to display the plurality of display images on screens, respectively; and
a plurality of camera modules configured to capture images of the screens, respectively,
wherein the management device is configured to periodically receive the plurality of screen image data from the plurality of camera modules.

18. The electronic system of claim 15, wherein the management device is configured to store a plurality of error types and a plurality of priorities of the plurality of error types, and
sequentially determine whether the error corresponds to the plurality of error types based on the plurality of priorities.

19. A method of managing errors of a monitored device that operates according to an operating system and is configured to generate a display image, the method being performed by a management device connected to the monitored device through a communication network, the method comprising:
periodically receiving, from the monitored device, screen image data corresponding to the display image;
determining whether an error that causes the operating system of the monitored device to become inoperable occurs in the operating system of the monitored device based on a network connection state with the monitored device;
based on determining that the error has occurred, comparing image type factors of a plurality of error determination factors with the screen image data to generate a first comparison result and comparing state type factors of the plurality of error determination factors with the network connection state to generate a second comparison result;
determining a type of the error according to the first comparison result and the second comparison result; and
transferring, to the monitored device, a request indicating an error correction procedure for the error, based on the type of the error.

20. The method of claim 19, wherein determining the type of the error comprises:
sequentially determining whether the error corresponds to one of a plurality of error types based on priorities of the plurality of error types.

* * * * *